United States Patent
Ahn et al.

(10) Patent No.: US 10,689,513 B2
(45) Date of Patent: Jun. 23, 2020

(54) COMPOSITION FOR PREPARING ARTICLE INCLUDING POLYIMIDE OR POLY(IMIDE-AMIDE) COPOLYMER, ARTICLE INCLUDING POLYIMIDE OR POLY(IMIDE-AMIDE) COPOLYMER, AND ELECTRONIC DEVICE INCLUDING THE ARTICLE

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Chanjae Ahn, Suwon-si (KR); Sungwon Choi, Hwaesong-si (KR); Byunghee Sohn, Yongin-si (KR); A Ra Jo, Euiwang-si (KR); Kyeong-sik Ju, Suwon-si (KR); Sang Soo Jee, Hwaesong-si (KR); Hongkyoon Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 465 days.

(21) Appl. No.: 15/419,019

(22) Filed: Jan. 30, 2017

(65) Prior Publication Data
US 2017/0218200 A1   Aug. 3, 2017

(30) Foreign Application Priority Data

Jan. 27, 2016   (KR) .......................... 10-2016-0009972

(51) Int. Cl.
*C08L 79/08*   (2006.01)
*C08G 73/10*   (2006.01)
(Continued)

(52) U.S. Cl.
CPC .............. *C08L 79/08* (2013.01); *C08G 69/32* (2013.01); *C08G 73/0672* (2013.01); *C08G 73/1003* (2013.01); *C08G 73/1039* (2013.01); *C08G 73/1042* (2013.01); *C08G 73/14* (2013.01); *C08K 3/105* (2018.01); *C08K 3/16* (2013.01);
(Continued)

(58) Field of Classification Search
CPC ............ C08G 73/1003; C08G 73/1039; C08G 73/1042; C08G 73/14; C08G 69/32; C08K 5/0091; C08K 5/357; C08K 5/56; C08K 3/105; C08K 3/16; C08K 3/28; C09B 69/10; C09B 69/101; C09B 69/103; C08L 79/08

See application file for complete search history.

(56) References Cited

U.S. PATENT DOCUMENTS

| 5,520,960 A | 5/1996 | Rancourt et al. |
| 9,018,343 B2 | 4/2015 | Park et al. |

(Continued)

FOREIGN PATENT DOCUMENTS

| EP | 3008133 A2 * | 4/2016 | ............ C09B 19/02 |
| JP | 2003073472 A * | 3/2003 | |

(Continued)

OTHER PUBLICATIONS

Extended European Search Report dated May 11, 2017, issued for the corresponding European Patent Application No. 17153291.4-1302.

*Primary Examiner* — Travis M Figg
(74) *Attorney, Agent, or Firm* — Cantor Colburn LLP

(57) ABSTRACT

A composition for preparing an article including a polyimide or poly(imide-amide) copolymer, the composition including (1) a solution including at least one of (i) a polymer including at least one selected from a structural unit represented by Chemical Formula 1 and a structural unit represented by Chemical Formula 2; and (ii) a copolymer including at least one selected from a structural unit represented by Chemical Formula 1 and a structural unit represented by Chemical Formula 2, and a structural unit represented by Chemical Formula 3, and (2) a metallic salt soluble in the solution of the polymer and/or the copolymer, wherein the metallic salt is a salt of a metal selected from a Group 1 element, a Group 11 element, a Group 13 element, and a Group 14 element:

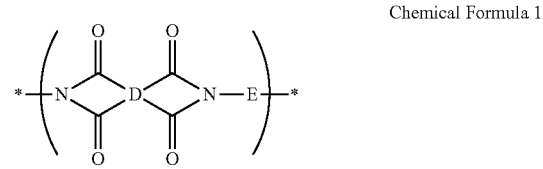

Chemical Formula 1

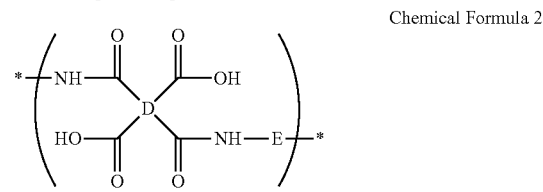

Chemical Formula 2

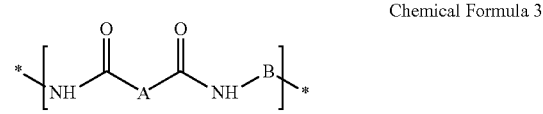

Chemical Formula 3 wherein in Chemical Formulae 1 to 3, A, B, D, and E are the same as defined in the detailed description.

20 Claims, No Drawings

(51) Int. Cl.
  *C08K 3/105*    (2018.01)
  *C08G 69/32*    (2006.01)
  *C09D 179/08*   (2006.01)
  *C08G 73/06*    (2006.01)
  *C08K 5/00*     (2006.01)
  *C08K 3/16*     (2006.01)
  *C08K 3/28*     (2006.01)
  *C08G 73/14*    (2006.01)

(52) U.S. Cl.
  CPC .............. *C08K 3/28* (2013.01); *C08K 5/0091* (2013.01); *C09D 179/08* (2013.01); *C08L 2205/025* (2013.01)

(56) References Cited

U.S. PATENT DOCUMENTS

| | | | |
|---|---|---|---|
| 2007/0082157 A1 | 4/2007 | Heater et al. | |
| 2012/0156482 A1* | 6/2012 | Hisano | B29C 41/24 428/343 |
| 2014/0031499 A1* | 1/2014 | Cho | C08G 73/1067 525/431 |
| 2014/0111962 A1* | 4/2014 | Park | G06F 3/041 361/818 |
| 2014/0205824 A1 | 7/2014 | Sun et al. | |
| 2014/0338959 A1* | 11/2014 | Jung | C08J 5/18 174/253 |
| 2015/0057426 A1* | 2/2015 | Cho | C08G 73/14 528/340 |
| 2015/0057427 A1* | 2/2015 | Cho | C08G 73/14 528/340 |
| 2017/0190880 A1* | 7/2017 | Jo | C08G 73/1039 |

FOREIGN PATENT DOCUMENTS

| | | |
|---|---|---|
| KR | 2002-0047723 A | 6/2002 |
| KR | 10-2013-0035691 A | 4/2013 |

* cited by examiner

COMPOSITION FOR PREPARING ARTICLE INCLUDING POLYIMIDE OR POLY(IMIDE-AMIDE) COPOLYMER, ARTICLE INCLUDING POLYIMIDE OR POLY(IMIDE-AMIDE) COPOLYMER, AND ELECTRONIC DEVICE INCLUDING THE ARTICLE

CROSS-REFERENCE TO RELATED APPLICATIONS

This application claims priority to Korean Patent Application No. 10-2016-0009972 filed in the Korean Intellectual Property Office on Jan. 27, 2016, and all the benefits accruing therefrom under 35 U.S.C. § 119, the content of which is incorporated herein in its entirety by reference.

BACKGROUND

1. Field

A composition for preparing an article including a polyimide or poly(imide-amide) copolymer, an article including a polyimide or poly(imide-amide) copolymer, and an electronic device including the article are disclosed.

2. Description of the Related Art

Portable display devices such as a smart phone or a tablet personal computer (PC) have been objects of active research because of their high performance and popularity. For example, research and development efforts to commercialize a light-weight flexible (i.e., bendable or foldable) portable display device have been undertaken. The portable display device of a liquid crystal display or the like includes a protective window for protecting a display module such as a liquid crystal layer. Currently, most portable display devices include a window including a rigid glass substrate. However, glass is a fragile material, which gets easily broken by an exterior impact when used in a portable display device or the like. Also, glass is a non-flexible material, so it may not be suitable for a flexible display device. Therefore, extensive efforts have been undertaken to substitute a protective window with a plastic film in a display device. However, it is very difficult for a plastic film to simultaneously satisfy optimal mechanical properties, such as hardness, and optimal optical properties, which are required for the protective window in a display device. Accordingly, the development of the plastic film material as a protective window for a display device has been delayed.

SUMMARY

An embodiment provides a composition for preparing an article including a polyimide or poly(imide-amide) copolymer.

Another embodiment provides an article having high mechanical characteristics and optical properties prepared by using the composition of an embodiment.

Yet another embodiment provides a display device including the article.

An embodiment provides a composition for preparing an article including a polyimide or poly(imide-amide) copolymer, the composition including:

(1) a solution including at least one of
(i) a polymer including at least one selected from a structural unit represented by Chemical Formula 1 and a structural unit represented by Chemical Formula 2; and
(ii) a copolymer including at least one selected from a structural unit represented by Chemical Formula 1 and a structural unit represented by Chemical Formula 2, and a structural unit represented by Chemical Formula 3, and
(2) a metallic salt soluble in the solution of the polymer and/or the copolymer, wherein the metallic salt is a salt of a metal selected from a Group 1 element, a Group 11 element, a Group 13 element, and a Group 14 element:

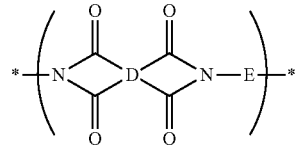

Chemical Formula 1

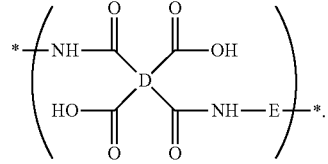

Chemical Formula 2

In Chemical Formulae 1 and 2,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, and the hetero aromatic ring group are present as a single ring, as a condensed ring system including two or more fused rings, or as a system including two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)(C$_6$H$_5$)—, —C(CF$_3$)$_2$—, or —C(=O)NH—, and E is a substituted or unsubstituted biphenylene group, wherein the substituted biphenylene group is substituted with an electron-withdrawing group,

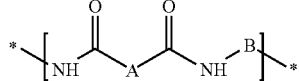

Chemical Formula 3

In Chemical Formula 3,

A is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, and the hetero aromatic ring group are present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and B is a substituted or unsubstituted biphenylene group, wherein the substituted biphenylene group is substituted with an electron-withdrawing group.

The metallic salt is selected from a salt of a metal selected from lithium (Li), sodium (Na), aluminum (Al), silver (Ag), and tin (Sn), and the metallic salt includes a cation of the metal and an anion selected from a halogen ion, acetylacetonate, ClO$^-$, SO$_4^{2-}$, PO$_4^{3-}$, and NO$_3^-$.

The metallic salt is at least one selected from LiCl, NaCl, AgBr, AgNO$_3$, SnCl$_2$, and aluminum acetylacetonate.

An amount of the metallic salt is less than 2.5 weight percent based on the total weight of the metallic salt and the at least one of the polymer and copolymer in the composition.

An amount of the metallic salt is from 0.1 weight percent to 2 weight percent based on the total weight of the metallic salt and the at least one of the polymer and copolymer in the composition.

D in Chemical Formula 1 and Chemical Formula 2 is independently selected from chemical formulae of Group 1:

Group 1

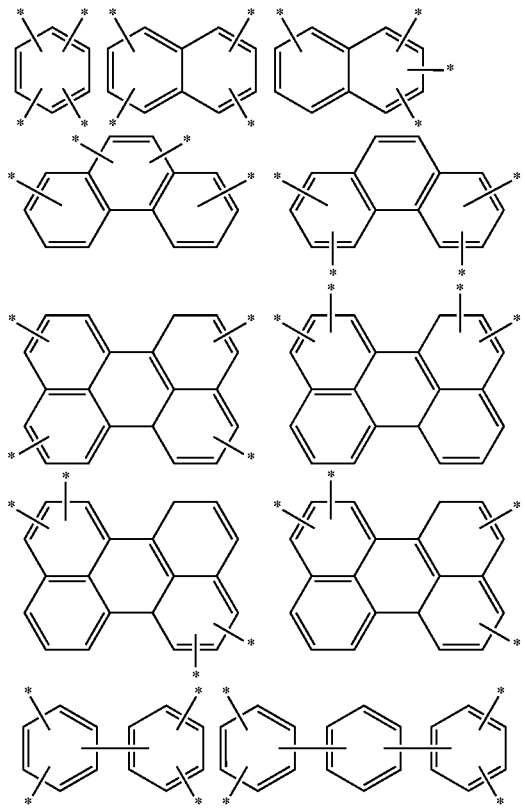

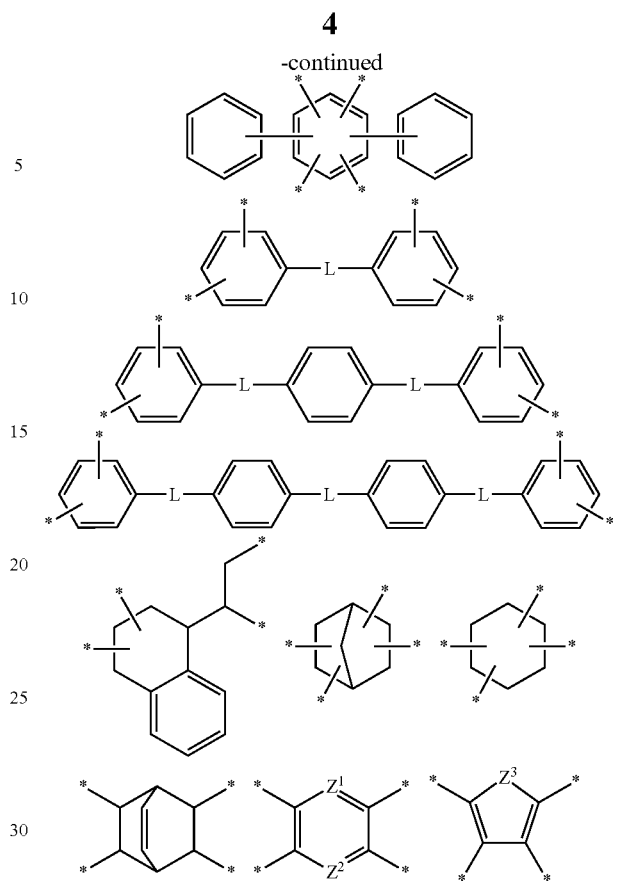

wherein, in the chemical formulae of Group 1, each residual group may be substituted or unsubstituted, and each L may be the same or different and may be independently a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, ★ is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

D in Chemical Formula 1 and Chemical Formula 2 is independently selected from chemical formulae of Group 2:

Group 2

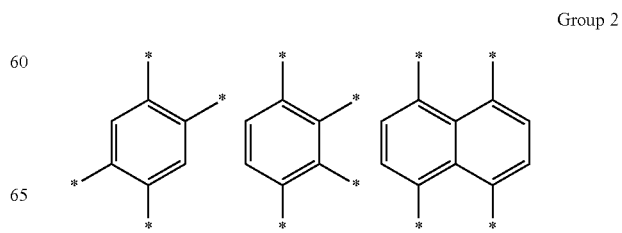

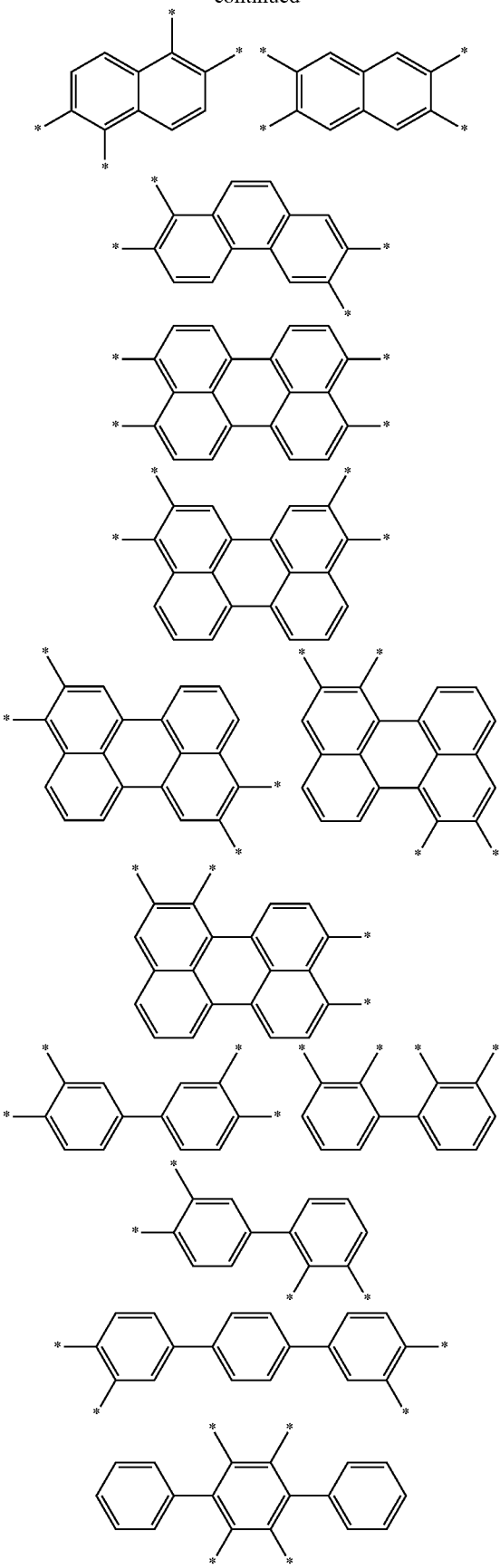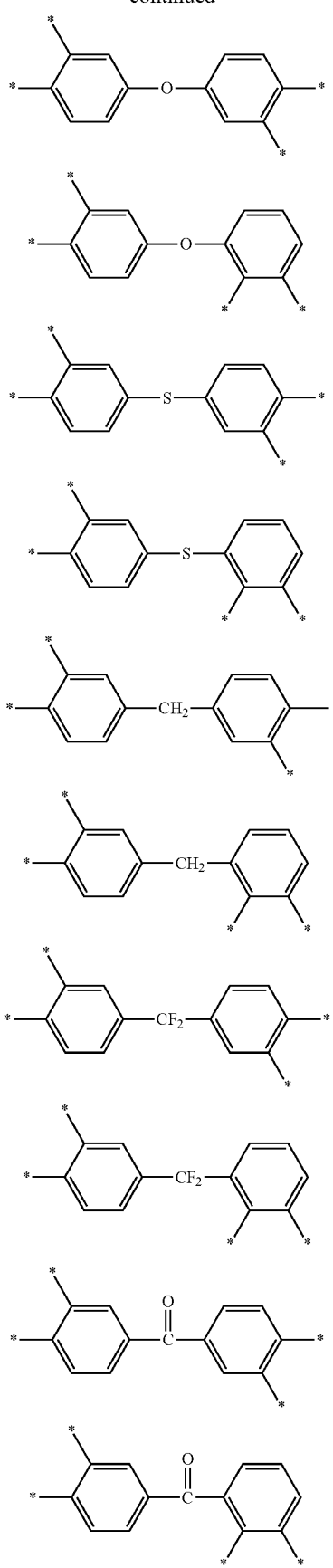

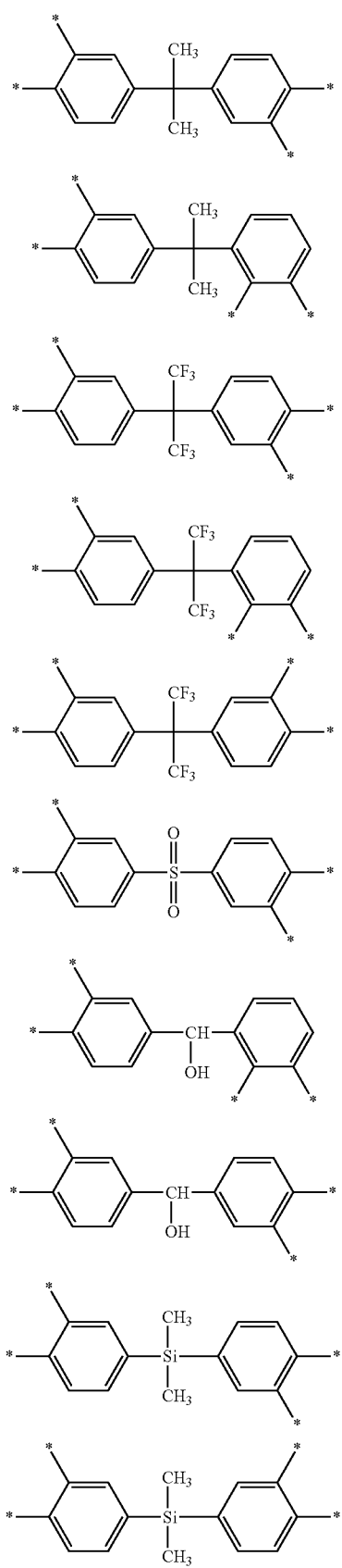
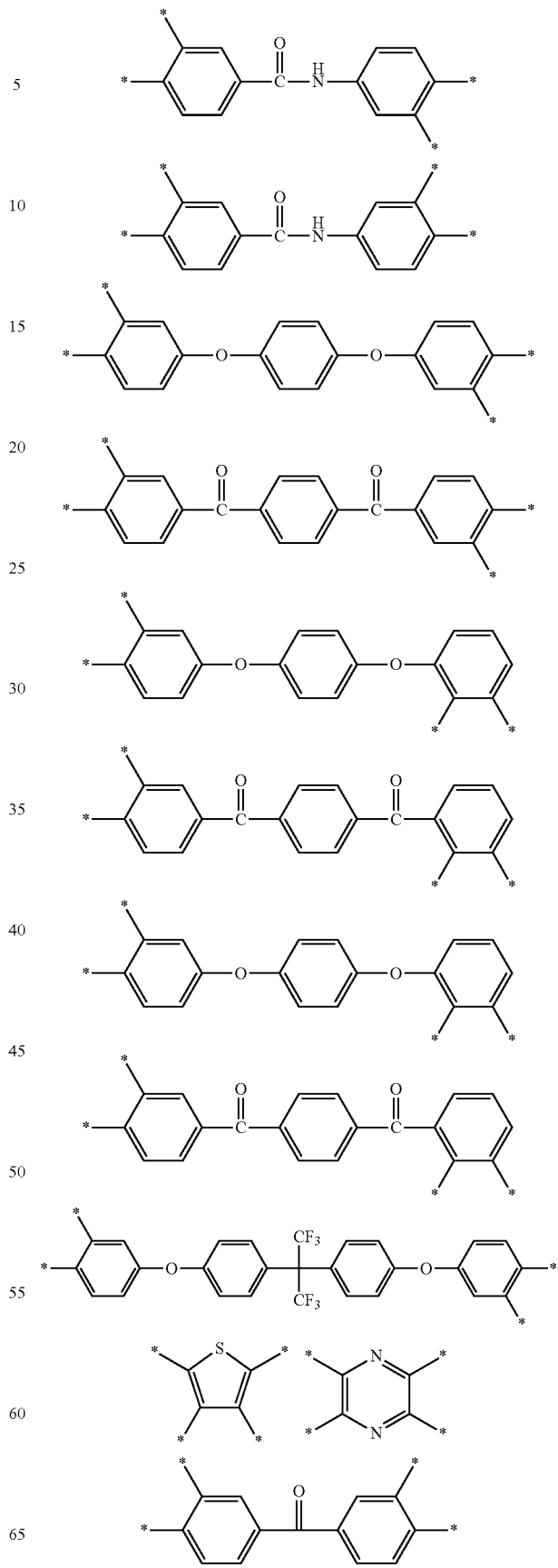

-continued

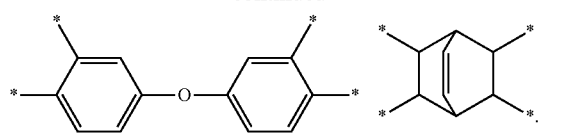

D in Chemical Formula 1 and Chemical Formula 2 is independently selected from chemical formulae of Group 3:

Group 3

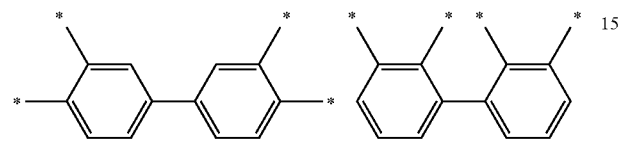

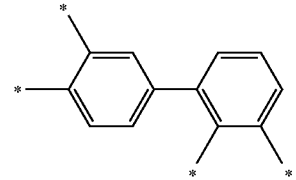

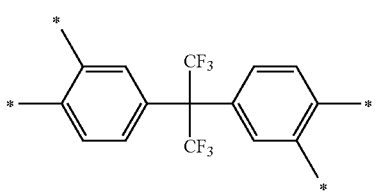

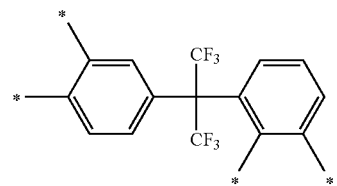

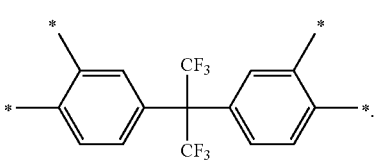

E in Chemical Formula 1 and Chemical Formula 2 is a substituted biphenylene group, each ring of which is substituted with an electron-withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$.

A in Chemical Formula 3 is selected from chemical formulae of Group 4:

Group 4

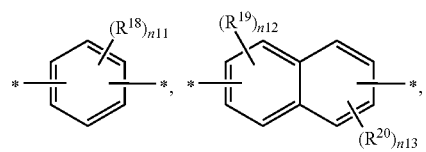

-continued

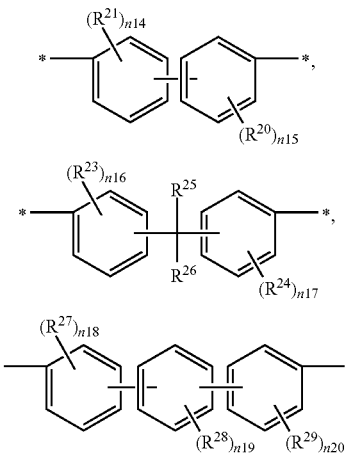

In the above chemical formulae, $R^{18}$ to $R^{29}$ are each independently deuterium, a halogen, a substituted or unsubstituted C1 to C10 aliphatic organic group, or a substituted or unsubstituted C6 to C20 aromatic organic group, n11 and n14 to n20 are each independently an integer ranging from 0 to 4, and n12 and n13 are each independently an integer ranging from 0 to 3.

A in Chemical Formula 3 may be selected from chemical formulae of Group 5:

Group 5

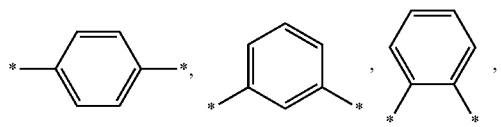

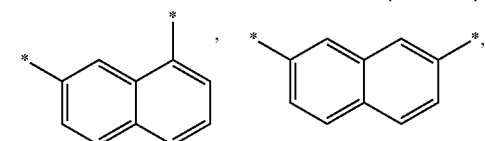

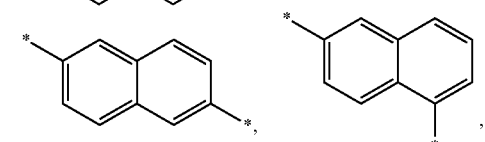

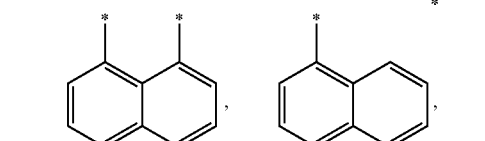

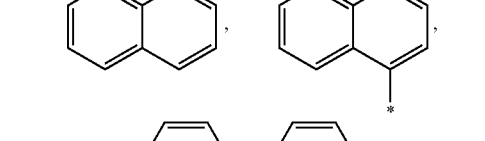

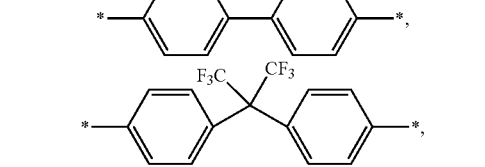

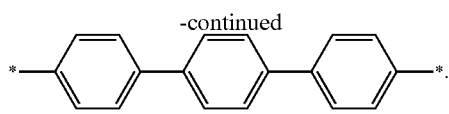

B in Chemical Formula 3 is a substituted biphenylene group, each ring of which is substituted with an electron-withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$.

The structural unit represented by Chemical Formula 1 may include at least one of a structural unit represented by Chemical Formula 4 and a structural unit represented by Chemical Formula 5:

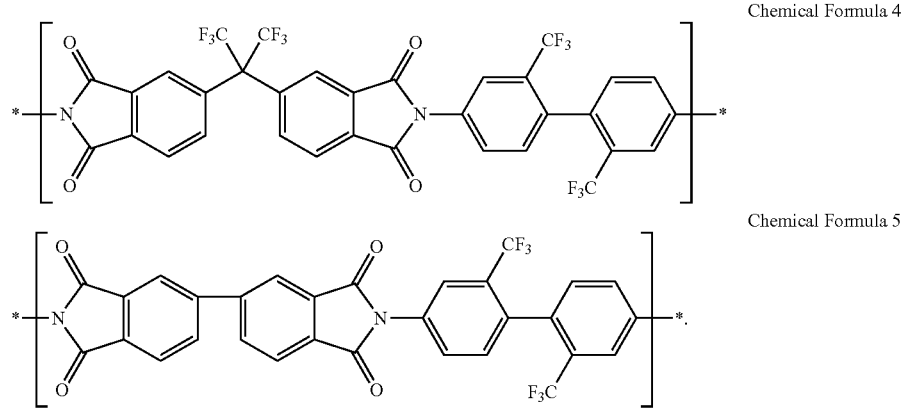

Chemical Formula 4

Chemical Formula 5

The structural unit represented by Chemical Formula 3 may include at least one of the structural units represented by Chemical Formula 6 to Chemical Formula 8:

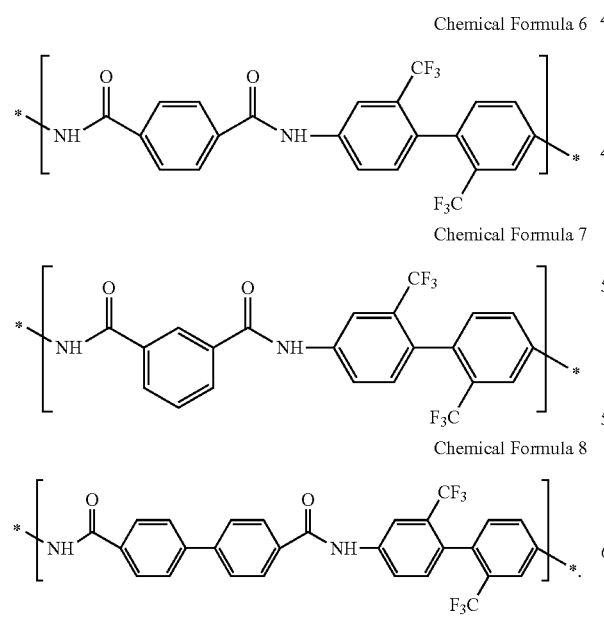

Chemical Formula 6

Chemical Formula 7

Chemical Formula 8

The poly(imide-amide) copolymer in the composition may include a structural unit represented by Chemical Formula 4, a structural unit represented by Chemical Formula 5, and a structural unit represented by Chemical Formula 6, and the metallic salt may include at least one selected from LiCl, NaCl, AgBr, AgNO$_3$, SnCl$_2$, and aluminum acetylacetonate.

The mole ratio of the structural unit represented by Chemical Formula 6 to the sum of the structural unit represented by Chemical Formula 4 and the structural unit represented by Chemical Formula 5 may range from about 80:20 to about 50:50.

The amount of the metallic salt may range from 0.1 weight percent to 2 weight percent based on the total weight of the poly(imide-amide) copolymer and the metallic salt.

Another embodiment provides an article prepared from the composition for preparing an article including a polyimide or polyimide-amide) copolymer according to an embodiment.

The article may be a film, the film having a yellow index of less than 3.5 according to an ASTM E313 method using a UV spectrophotometer (Konica Minolta Inc., cm-3600d) and a tensile modulus of greater than 6.7 gigapascals according to an ASTM D882 method.

The film may have a thickness of about 10 micrometers to about 100 micrometers.

Another embodiment provides a display device including the article according to the embodiment.

DETAILED DESCRIPTION

This disclosure will be described more fully hereinafter, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as the meanings commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Mixture" as used herein is inclusive of all types of combinations, including blends, alloys, solutions, and the like.

As used herein, when a specific definition is not otherwise provided, the term "substituted" refers to a functional group substituted with at least one substituent selected from a halogen atom (F, Cl, Br, or I), a hydroxy group, a nitro group, a cyano group, an amino group (—$NH_2$, —$NH(R^{100})$ or —$N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., cycloalkyl group), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group, and a substituted or unsubstituted heterocyclic group in place of at least one hydrogen of the given functional group, or the substituents may be linked to each other to provide a ring.

As used herein, when specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refers to a C1 to C30 alkoxy group, for example, a C1 to C18 alkoxy group, the term "ester group" refers to a C2 to C30 ester group, for example, a C2 to C18 ester group, the term "ketone group" refers to a C2 to C30 ketone group, for example, a C2 to C18 ketone group, the term "aryl group" refers to a C6 to C30 aryl group, for example, a C6 to C18 aryl group, the term "alkenyl group" refers to a C2 to C30 alkenyl group, for example, a C2 to C18 alkenyl group, the term "alkynyl group" refers to a C2 to C30 alkynyl group, and specifically a C2 to C18 alkynyl group, the term "heteroaryl group" refers to a C3 to C30 heteroaryl group, and specifically a C3 to C18 heteroaryl group, and the term "heterocyclic group" refers to a C2 to C30 heterocyclic group, and specifically a C2 to C18 heterocyclic group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when specific definition is not otherwise provided, the term "combination" refers to mixing or copolymerization. Herein, "copolymerization" refers to a random copolymerization, a block copolymerization, or a graft copolymerization.

In addition, in the specification, "*" or "★" may refer to a point of attachment to nitrogen, carbon, or another atom.

A composition for preparing an article including a polyimide or poly(imide-amide) copolymer according to an embodiment includes:

(1) a solution including at least one of
  (i) a polymer including at least one selected from a structural unit represented by Chemical Formula 1 and a structural unit represented by Chemical Formula 2; and
  (ii) a copolymer including at least one selected from a structural unit represented by Chemical Formula 1 and a structural unit represented by Chemical Formula 2, and a structural unit represented by Chemical Formula 3, and
(2) a metallic salt soluble in the solution of the polymer and/or copolymer, wherein the metallic salt is a salt of a metal selected from a Group 1 element, a Group 11 element, a Group 13 element, and a Group 14 element:

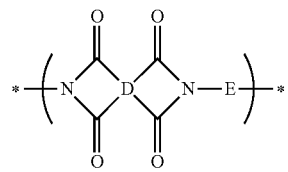

Chemical Formula 1

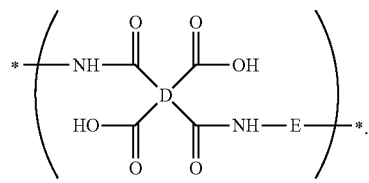

Chemical Formula 2

In Chemical Formulae 1 and 2,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, and the hetero aromatic ring group are present as a single ring, as a condensed ring system including two or more fused rings, or as a system including two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)(C$_6$H$_5$)—, —C(CF$_3$)$_2$—, or —C(=O)NH—, and E is a substituted or unsubstituted biphenylene group, wherein the substituted biphenylene group is substituted with an electron-withdrawing group Chemical Formula 3

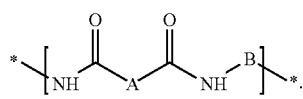

In Chemical Formula 3,

A is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, and the hetero aromatic ring group are present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and B is a substituted or unsubstituted biphenylene group, wherein the substituted biphenylene group is substituted with an electron-withdrawing group.

The polyimide or poly(imide-amide) copolymer has high light transmittance, thermal stability, mechanical strength, flexibility, and the like, and thus, may be useful as a display substrate material. In general, a display device is manufactured through a high temperature process at greater than or equal to about 350° C., such as a high temperature deposition, a high temperature annealing, and the like. The treatment at a high temperature of greater than or equal to a glass transition temperature rearranges polyimide or poly(imide-amide) molecules, which leads to packing of the polymer chains. The increased packing among the polymer chains of the polyimide or poly(imide-amide) copolymer tends to increase surface hardness of a film formed of the polymer or the copolymer, and thus, has a favorable effect of increasing mechanical properties of the film. However, the increased packing among the polymer chains also increases the yellow index of the film. Herein, the polyimide or poly(imide-amide) copolymer has a structure called a "charge transfer complex (CTC)", in which an electron donor and an electron acceptor are adjacent to each other, and thus, a polyimide or poly(imide-amide) film absorbs light in a particular short wavelength region due to an electron movement (excitation) between potentials formed due to the CTC structure. Accordingly, as transmittance in a blue region of less than or equal to about 400 nanometers (nm), which is essential for manufacturing a display, is substantially deteriorated, the film becomes yellow. This is called as 'yellowing phenomenon' occurring due to the high temperature heat treatment. In other words, the mechanical characteristics and the optical properties of the polyimide or poly(imide-amide) copolymer film have a trade-off relationship, and accordingly, it is difficult to improve the mechanical properties, such as, a high tensile modulus and pencil hardness of the film, while maintaining high optical properties of the film.

In order to improve mechanical properties of a polyimide or poly(imide-amide) copolymer film, while maintaining optical properties of the film, experiments have been performed to increase the amount of an amide structural unit or the amount of a monomer having a rigid structure among dianhydrides forming an imide structural unit. However, the resulting polyimide or poly(imide-amide) copolymer exhibits an insignificant increase in the tensile modulus, while optical properties, such as, yellowness index, has been deteriorated due to the increase of the amount of the amide structural unit. That is, there is a limit to increase mechanical properties or optical properties by adjusting the composition or amount of the monomers of a polyimide or poly(imide-amide) copolymer, so it is very difficult to improve the two properties simultaneously.

The composition of an embodiment may advantageously be used to prepare an article including a polyimide or poly(imide-amide) copolymer having an improved mechanical properties, for example, a tensile modulus, without being deteriorated in optical properties of the article.

The composition according to an embodiment includes a solution of a polymer including a polyimide and/or a polyamic acid, which is a precursor of the polyimide, and/or a copolymer including a poly(imide and/or amic acid-amide) copolymer, and a metallic salt soluble in the solution. The metallic salt dissolves in the solution of the polymer and/or copolymer, and the dissolved metallic ion of the metallic salt is believed to bind to the polymer and/or copolymer in the solution. In this case, the metallic salt may homogeneously be present in the solution, and may prevent the polymer and/or copolymer from forming the CTC structure when cured by heat treatment. Accordingly, an article, for example, a film, prepared from the composition that includes the metallic salt, may have an improved mechanical properties due to the presence of the metallic salt, which is an inorganic material, while maintaining good optical properties of the film.

The metallic salt may be a salt of a metal selected from a Group 1 element, a Group 11 element, a Group 13 element, and a Group 14 element, but is not limited thereto, as long as it can dissolve in the solution of the polymer and/or copolymer.

In an exemplary embodiment, the metal of the metallic salt may be selected from lithium (Li), sodium (Na), aluminum (Al), silver (Ag), and tin (Sn), but is not limited thereto.

In an exemplary embodiment, the metallic salt may include a cation of the metal and an anion selected from a halogen ion, acetylacetonate, ClO$^-$, SO$_4^{2-}$, PO$_4^{3-}$, and $NO_3^-$, but is not limited thereto, as long as it can dissolve in a solution of the polymer and/or copolymer.

In an exemplary embodiment, the metallic salt may be at least one selected from LiCl, NaCl, AgBr, $AgNO_3$, $SnCl_2$, and aluminum acetylacetonate, but is not limited thereto.

The metallic salt may be included in an amount of less than 2.5 weight percent (wt %) based on the total weight of the polymer and/or copolymer and the metallic salt in the composition. By including the metallic salt in the above range, an article prepared from the composition may have increased mechanical properties, while good optical properties are maintained. When the amount of the metallic salt is greater than or equal to 2.5 wt %, viscosity of the composition may increase, which may render it difficult to fabricate a film. Otherwise, if the amount of the metallic salt further increases, the metallic salt may precipitate in the film prepared from the composition, even though the film can be fabricated.

While the amount of the metallic salt is not specifically limited in the above range, the amount may range from 0.1 wt % to 2 wt % based on the total weight of the polymer and/or copolymer and the metallic salt in the composition. By including the metallic salt in the above range, an article, for example, a film having a thickness of about 10 micrometers to about 100 micrometers, prepared from the composition, may have a yellow index of less than 3.5, for example, less than 3.3, according to an ASTM E313 method using a UV spectrophotometer (Konica Minolta Inc., cm-3600d), and a transmittance of light in a range of from 370 nanometers to 740 nanometers of greater than or equal to 85 percent, for example, 86 percent, and for example, 87 percent, which shows good optical properties. In this case, the film may have a tensile modulus of greater than 6.7 gigapascals (GPa), for example, 7 GPa, for example, 7.5 GPa, according to an ASTM D882 method.

As such, the composition can improve mechanical properties, such as, a tensile modulus, of an article prepared therefrom by including less than 2.5 weight percent of the metallic salt based on the total solid content of the composition, while maintaining good optical properties of a polyimide or poly(imide-amide), compared with the composition that does not include the metallic salt.

In the composition, D in Chemical Formula 1 and Chemical Formula 2, which are an imide and an amic acid structural unit, respectively, may be selected from chemical formulae of Group 1:

Group 1

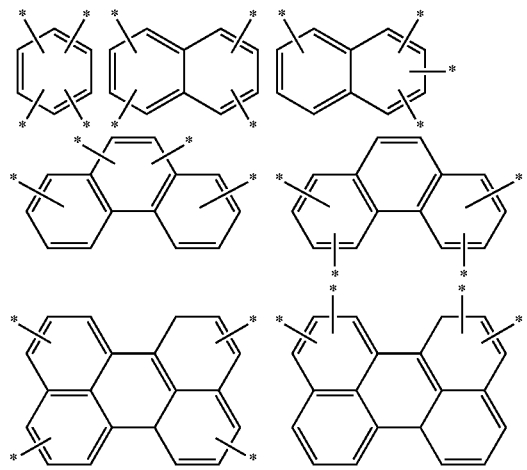

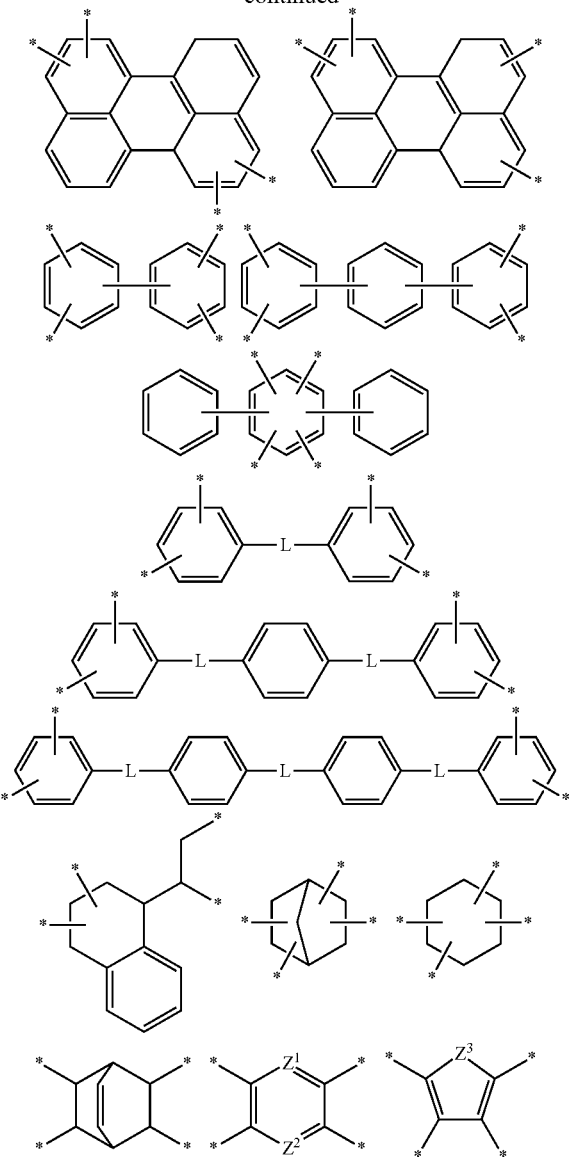

wherein, in the chemical formulae of Group 1,
each residual group may be substituted or unsubstituted, and
each L may be the same or different and may be independently a single bond, —O—, —S—, —C(=O)—, —CH(OH)—, —S(=O)$_2$—, Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to 010 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, ★ is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

The chemical formulae of Group 1 may be represented by the chemical formulae of Group 2, but are not limited thereto:

Group 2
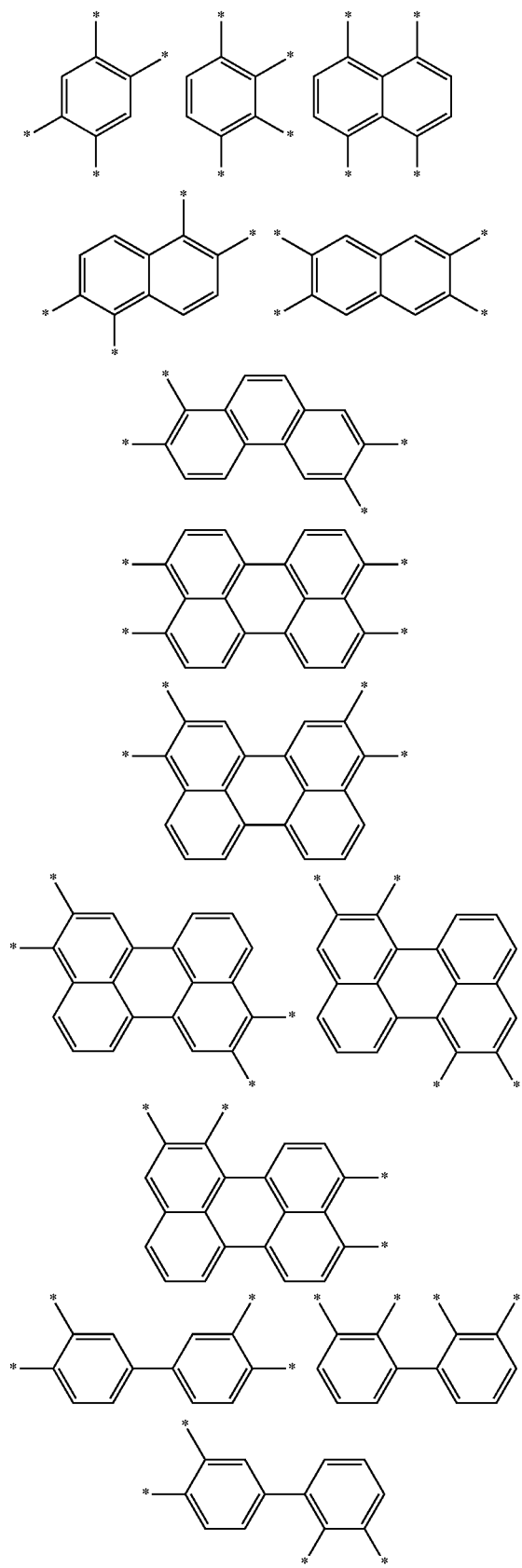
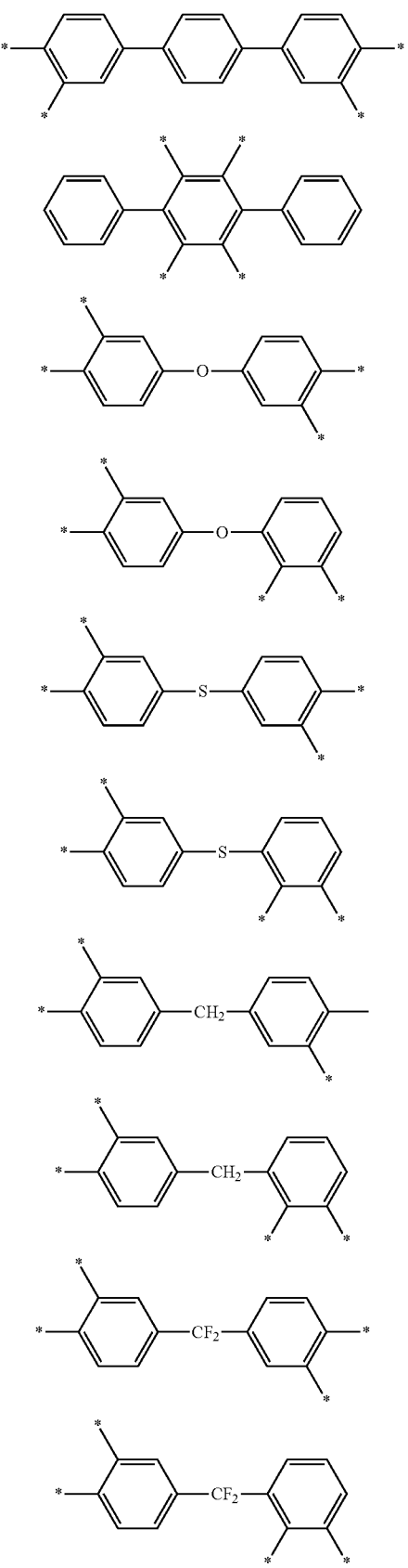

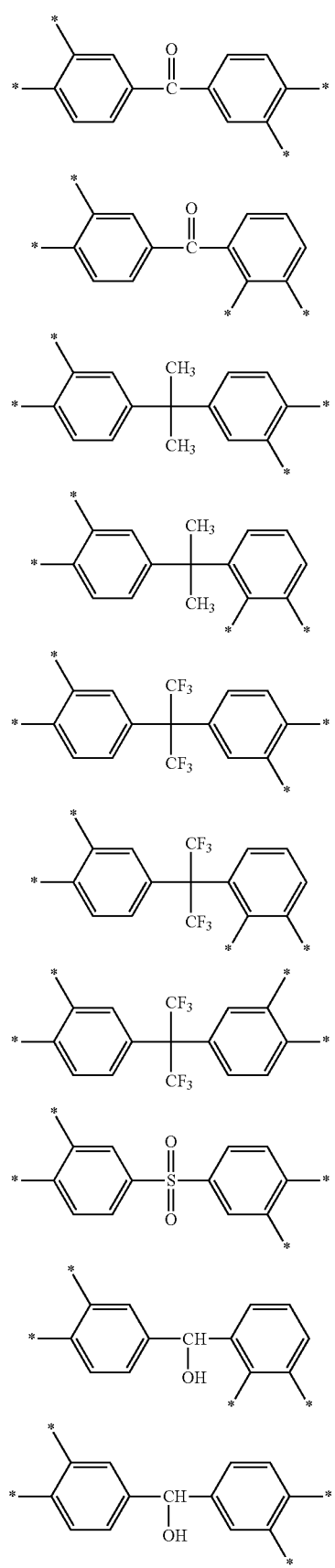
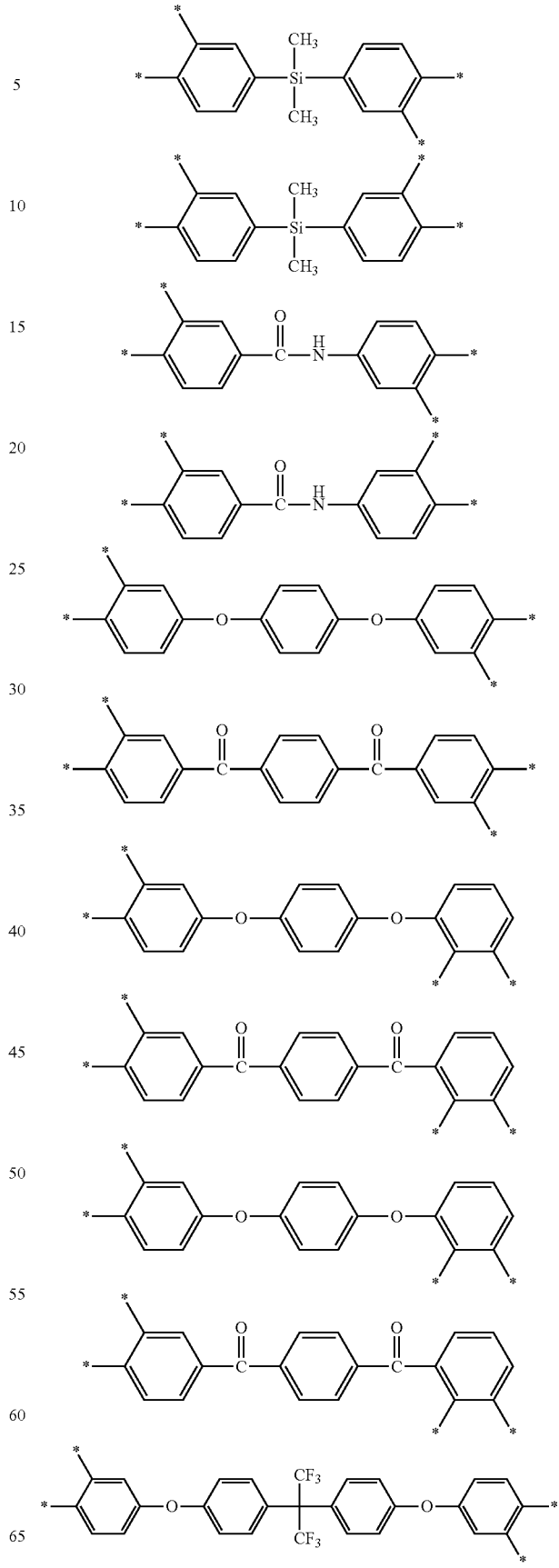

-continued

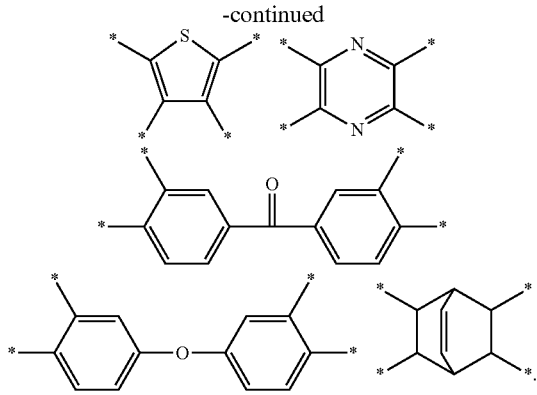

In an exemplary embodiment, D in Chemical Formula 1 and Chemical Formula 2 may be selected from chemical formulae of Group 3:

Group 3

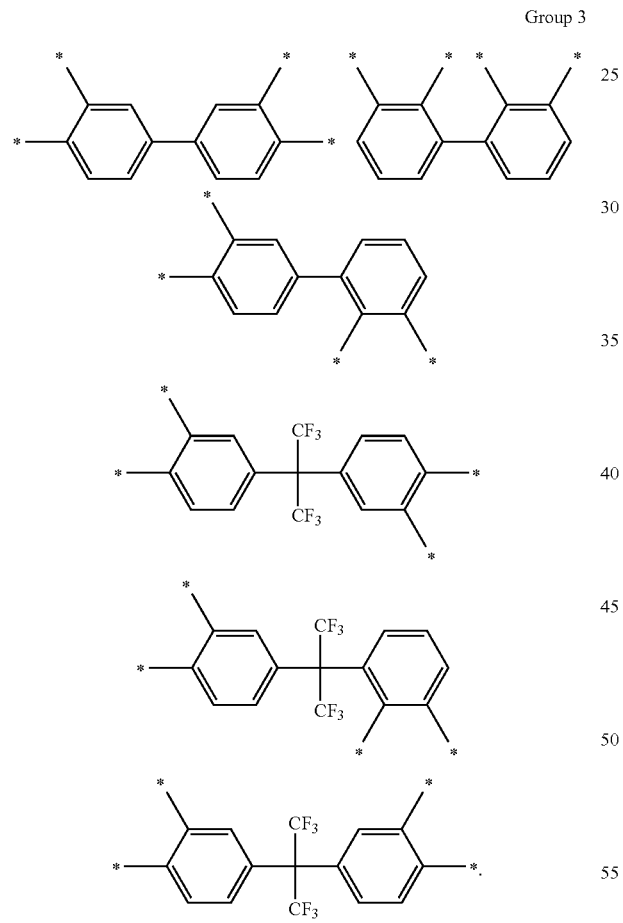

E in Chemical Formula 1 and Chemical Formula 2 may be a substituted biphenylene group, each ring of which is substituted with an electron-withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$.

In an exemplary embodiment, E in Chemical Formula 1 and Chemical Formula 2 may be represented by Chemical Formula 9:

Chemical Formula 9

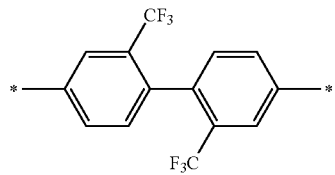

In an exemplary embodiment, A in Chemical Formula 3 may be selected from chemical formulae of Group 4:

Group 4

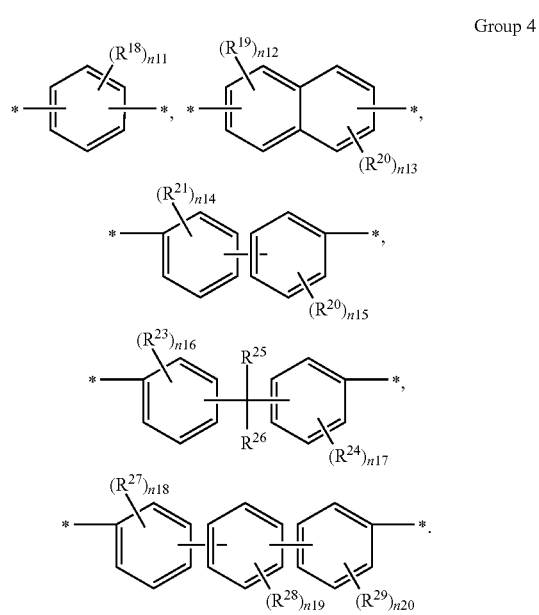

In the chemical formulae represented by Group 4, $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are each independently an integer ranging from 0 to 4, and n12 and n13 are each independently an integer ranging from 0 to 3.

In an exemplary embodiment, the chemical formulae of Group 4 may be, for example, represented by chemical formulae of Group 5, but are not limited thereto:

Group 5

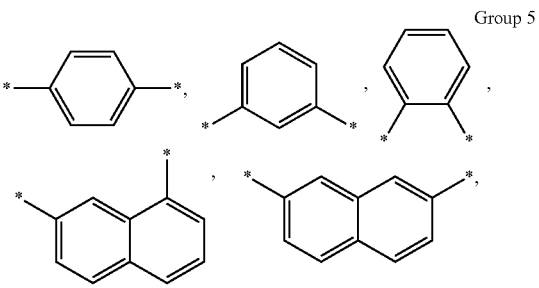

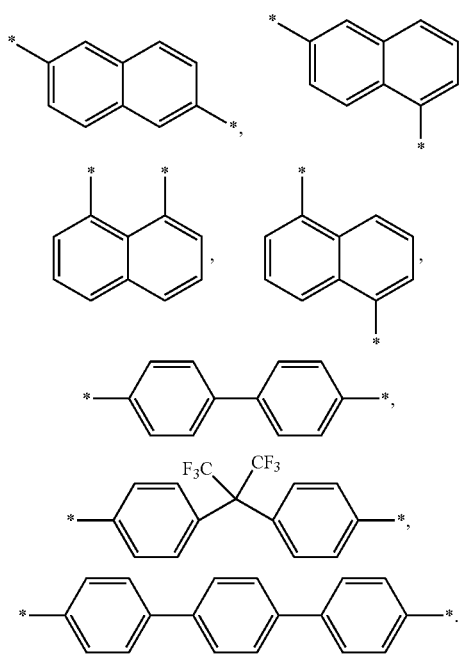

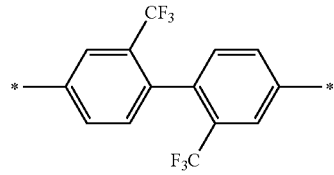
Chemical Formula 9

In an exemplary embodiment, the structural unit represented by Chemical Formula 1 may include at least one selected from a structural unit represented by Chemical Formula 4 and a structural unit represented by Chemical Formula 5:

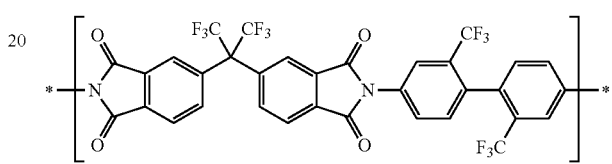
Chemical Formula 4

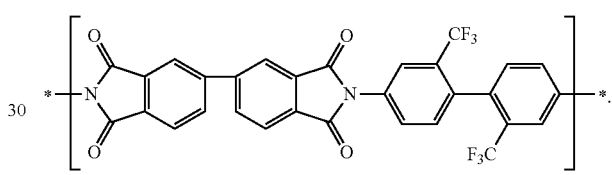
Chemical Formula 5

In an exemplary embodiment, B in Chemical Formula 3 may be a substituted biphenylene group, each ring of which is substituted with an electron-withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$.

In an exemplary embodiment, B in Chemical Formula 3 may be the same as E in Chemical Formula 1 and Chemical Formula 2, and, for example, may be represented by Chemical Formula 9:

In an exemplary embodiment, the structural unit represented by Chemical Formula 3 may include at least one selected from structural units represented by Chemical Formula 6 to Chemical Formula 8:

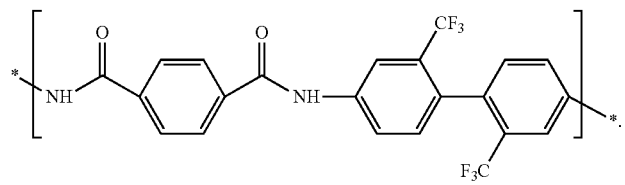
Chemical Formula 6

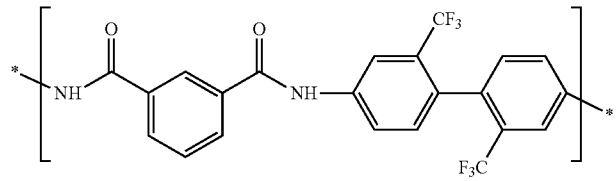
Chemical Formula 7

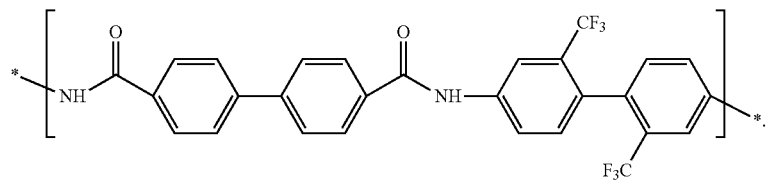
Chemical Formula 8

In an exemplary embodiment, a composition for preparing an article including a poly(imide-amide) copolymer may include a poly(imide-amide) copolymer including a structural unit represented by Chemical Formula 4, a structural unit represented by Chemical Formula 5, and a structural unit represented by Chemical Formula 6, and a metallic salt including at least one selected from LiCl, NaCl, AgBr, AgNO$_3$, SnCl$_2$, and aluminum acetylacetonate, for example, at least one of LiCl and AgNO$_3$.

In the composition, an amount of the metallic salt may range from about 0.1 weight percent to about 2.5 weight percent, for example, from about 0.1 weight percent to about 2.0 weight percent, for example, from about 0.5 weight percent to about 2.0 weight percent, for example, from about 1 weight percent to about 1.9 weight percent, based on the total weight of the poly(imide-amide) copolymer and the metallic salt in the composition.

By including the metallic salt in the above range, an article prepared from the composition may have increased mechanical properties, while good optical properties are maintained. For example, when a film having a thickness of about 10 micrometers (μm) to about 100 μm is prepared from the composition, the film may have a yellow index of less than 3.5, for example, less than or equal to 3.3, according to an ASTM E313 method using a UV spectrophotometer (Konica Minolta Inc., cm-3600d), and a tensile modulus of greater than 6.7 gigapascals (GPa), for example, 7.0 GPa, for example, 7.5 GPa, according to an ASTM D882 method.

As shown from the Examples and Comparative Examples, the tensile moduli of the films according to the Examples are much higher than that according to Comparative Example 1, which does not include a metallic salt. That is, the film prepared from the composition according to Comparative Example 1, in which the composition includes a poly(imide-amide) copolymer including a structural unit represented by Chemical Formula 4, a structural unit represented by Chemical Formula 5, and a structural unit represented by Chemical Formula 6, but not including the metallic salt, has a yellow index of 2.8 according to an ASTM E313 method using a UV spectrophotometer (Konica Minolta Inc., cm-3600d), and a tensile modulus of 6.7 GPa according to an ASTM D882 method, when the film has a thickness of about 10 μm to about 80 μm. However, the film prepared from the composition according to Example 1, in which the composition includes the same poly(imide-amide) copolymer as Comparative Example 1, but further includes about 1 wt % of a metallic salt based on the total solid content of the composition, has a yellow index of 2.7 according to an ASTM E313 method using a UV spectrophotometer (Konica Minolta Inc., cm-3600d), and a tensile modulus of 7.6 GPa according to an ASTM D882 method, when the film has the same thickness as that of Comparative Example 1. That is, the film according to Example 1 has much higher tensile modulus than that of Comparative Example 1. Accordingly, a film according to an embodiment can have a greatly increased mechanical properties, while maintaining optical properties. The tensile modulus may continuously increase in proportion to the amount of the metallic salt until it reaches 2.5 weight percent based on the total solid content of the composition, although the yellow index may also slightly increase in the range, but it may still be less than 3.5, indicating that good optical properties are maintained.

The film according to an embodiment may also have a high transmittance of light, for example, greater than or equal to 85%, for example, greater than or equal to 86%, for example, greater than or equal to 87%, for example, greater than or equal to 87.5%, in a range of from 370 nm to 740 nm. Further, when the film is exposed to ultraviolet B (UVB) light for 72 hours (greater than or equal to 200 millijoules per square centimeter, mJ/cm$^2$), the increase in yellow index, that is, ΔYI, after the exposure is less than 1, for example, less than or equal to 0.9, for example, less than or equal to 0.8.

Accordingly, an article prepared from the composition according to an embodiment, for example, a film, may advantageously be used in a display device that requires high optical properties, as well as good mechanical properties. For example, the film may be used as a protective film that requires flexibility for fabricating a flexible substrate, LED (light emitting diode), semiconductor sensor, and the like.

In an exemplary embodiment, the poly(imide-amide) copolymer may include the structural unit represented by Chemical Formula 6 and the at least one selected from the structural unit represented by Chemical Formula 4 and the structural unit represented by Chemical Formula 5 in a mole ratio of 80:20 to 50:50, for example, 75:25 to 50:50, and for example, 70:30 to 50:50, but is not limited thereto.

The composition according to an embodiment may be prepared by preparing a solution including at least one of a polymer including a structural unit represented by Chemical Formula 1, a structural unit represented by Chemical Formula 2, or a combination thereof; and a copolymer including a structural unit represented by Chemical Formula 1 and/or a structural unit represented by Chemical Formula 2, and a structural unit represented by Chemical Formula 3, and adding a metallic salt to the solution including at least one of the polymer and copolymer. The solution including at least one of the polymer and copolymer may easily be prepared by polymerization of monomers by known polyimide and polyamide manufacturing methods in this art. For example, the imide structural unit may be prepared by reacting a diamine with a dianhydride in an aprotic polar organic solvent.

Examples of the diamine compound used in the preparation of an imide structural unit represented by Chemical Formula 1 may include at least one selected from 4,4'-diamino-biphenyl; 3,3'-diamino-biphenyl; 3,3'-dichloro-4,4'-diamino-biphenyl; 3,3'-dimethyl-4,4'-diamino-biphenyl; and 2,2'-bis(trifluoromethyl)-4,4'-biphenyldiamine (TFDB), but is not limited thereto. Such diamine compounds may be commercially available or may be obtained by a well-known method.

For example, the diamine compound may be 2,2'-bis (trifluoromethyl)-4,4'-biphenyldiamine (TFDB).

The dianhydride may be a tetracarboxylic dianhydride, and such a compound may be 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenyl sulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7- dichloronaphthalene-1,4,5,8-tetracarboxylic dianhydride; 2,3,6,7-tetrachloronaphthalene-1,4,5,8-tetracarboxylic dianhydride; 2,2',3,3'-biphenyl tetracarboxylic dianhydride; 4,4'-bis(3,4-dicarboxyphenoxy)biphenyl dianhydride; bis(2,3-dicarboxylphenyl) ether dianhydride; 4,4'-bis(2,3-dicarboxyphenoxy) diphenyl ether dianhydride; 4,4'-bis(3,4-dicarboxyphenoxy) diphenyl ether dianhydride; bis(3,4-dicarboxylphenyl) sulfide dianhydride; 4,4'-bis(2,3-dicarboxyphenoxy) diphenyl sulfide dianhydride; 4,4'-bis(3,4-dicarboxyphenoxy) diphenyl sulfide dianhydride; bis(3,4-dicarboxylphenyl) sulfone dianhydride; 4,4'-bis(2,3-dicarboxyphenoxy) diphenyl sulfone dianhydride; 4,4'-bis(3,4-dicarboxylphenoxy) diphenyl sulfone dianhydride; 3,3',4,4'-benzophenone tetracarboxylic dianhydride; 2,2',3,3'-benzophenone tetracarboxylic dianhydride; 2,3,3'4'-benzophenone tetracarboxylic dianhydride; 4,4'-bis(3,4-dicarboxylphenoxy) benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy) phenyl] propane dianhydride; 2,2-bis[4-(3,4-dicarboxylphenoxy) phenyl] propane dianhydride; 2,2-bis[4-(2,3-dicarboxylphenoxy)-4'-(3,4-dicarboxylphenoxy) diphenyl] propane dianhydride; 2,2-bis[4-(3,4-dicarboxylphenoxy-3,5-dimethyl) phenyl] propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy) phenyl] hexafluoropropane dianhydride; 1,1-bis[4-(3,4-dicarboxylphenoxy) phenyl]-1-phenyl-2,2,2-trifluoroethane dianhydride; and 4,4'-bis[2-(3,4-dicarboxylphenyl)hexafluoroisopropyl] diphenyl ether dianhydride. Such anhydride compounds may be commercially available or may be obtained by a well-known method.

In an exemplary embodiment, the tetracarboxylic acid dianhydride may be 3,3',4,4'-biphenyl tetracarboxylic dianhydride (BPDA), 4,4'-(hexafluoroisopropylidene) diphthalic anhydride (6FDA), or a combination thereof.

On the other hand, the well-known polyamide manufacturing method may include low temperature solution polymerization, interface polymerization, fusion polymerization, solid-phase polymerization, and the like. For example, the low temperature solution polymerization may be performed by reacting a dicarboxylic dihalide and a diamine in an aprotic polar solvent to form the amide structural unit represented by Chemical Formula 3.

The dicarboxylic dihalide may be at least one selected from terephthaloyl chloride (TPCl), isophthaloyl chloride (IPCl), biphenyl dicarbonyl chloride (BPCl), naphthalene dicarbonyl chloride, terphenyl dicarbonyl chloride, 2-fluoroterephthaloyl chloride, and a combination thereof.

In an exemplary embodiment, the dicarboxylic dihalide may be terephthaloyl chloride (TPCl).

A diamine for forming the amide structural unit may be the same diamine compound as used for forming the imide and/or amic acid structural unit. In other words, the amide structural unit may be formed by using at least one kind of the same or different diamine among the aforementioned diamine compounds.

In an exemplary embodiment, diamine for forming an amide structural unit with the dicarboxylic dihalide may be 2,2'-bis(trifluoromethyl)-4,4'-biphenyldiamine (TFDB).

The aprotic polar solvent may be, for example, a sulfoxide-based solvent such as dimethyl sulfoxide, diethyl sulfoxide and the like, a formamide-based solvent such as N,N-dimethyl formamide, N,N-diethylformamide, and the like, an acetamide-based solvent such as N,N-dimethyl acetamide, N,N-diethylacetamide and the like, a pyrrolidone-based solvent such as N-methyl-2-pyrrolidone, N-vinyl-2-pyrrolidone and the like, a phenol-based solvent such as phenol, o-, m- or p-cresol, xylenol, halogenated phenol, catechol, and the like, or hexamethylphosphoramide, γ-butyrolactone, and the like. These solvents may be used alone or as a mixture of two or more solvents. However, the examples of solvents are not limited thereto, and an aromatic hydrocarbon such as xylene and toluene may also be used.

The amide structural unit is formed by placing a diamine and a dicarboxylic dihalide in the same reactor and allowing them to react. The diamine and dianhydride for forming the imide and/or amic acid structural unit are then added thereto and reacted therewith to prepare a poly(amic acid-amide) copolymer.

Alternatively, the diamine and the dicarboxylic dihalide for forming the amide structural unit are reacted to prepare an amide oligomer having an amino group at both ends thereof, and a dianhydride is added to the resultant, which is used as a diamine monomer, to prepare a poly(amic acid-amide) copolymer. The latter method may require no precipitation process for removing HCl generated from a process of forming amide, and thus, the method may shorten a process time and increase a yield of producing a final product, the poly(amide-imide) copolymer.

The polyamic acid or poly(amic acid-amide) copolymer may be, optionally, partially or completely chemically or thermally imidized to prepare a poly(imide and/or amic acid) or poly(imide and/or amic acid-amide) copolymer, and the metallic salt may be added to the solution containing the poly(imide and/or amic acid) or poly(imide and/or amic acid-amide) copolymer in an amount of less than 2.5 weight percent based on the total content of the poly(imide and/or amic acid) or poly(imide and/or amic acid-amide) copolymer and the metallic salt to prepare a composition for preparing an article including a polyimide or poly(imide-amide) copolymer according to an embodiment.

Adding the metallic salt to the solution of the poly(imide and/or amic acid) or poly(imide and/or amic acid-amide) copolymer may be performed by first dissolving a metallic salt in an organic solvent which is the same as that in which the poly(imide and/or amic acid) or poly(imide and/or amic acid-amide) copolymer dissolves, and then, adding the solution of the metallic salt to the solution of the poly(imide and/or amic acid) or poly(imide and/or amic acid-amide) copolymer. When dissolving the metallic salt in an organic solvent, the concentration of the metallic salt in the solution may be about 1% based on the total weight of the solution.

The prepared composition for preparing an article including a polyimide or polyimide-amide) copolymer may be coated on a substrate and the like by a well-known coating method, and then, dried and cured in the presence of heat or the like to manufacture an article, such as, for example, a film.

As described above, the prepared film has an improved mechanical properties, such as, for example, a tensile modulus, without being deteriorated in optical properties compared with a film consisting of only a polyimide or poly (imide-amide) copolymer. In an exemplary embodiment, a film prepared from the composition may have a yellow index (YI) of less than 3.5, for example, less than or equal to 3.3, at a thickness of about 10 micrometers (μm) to about 80 μm according to an ASTM E313 method using a UV spectrophotometer (Konica Minolta Inc., cm-3600d). In addition, after exposing the film to ultraviolet light B (UVB) for 72 hours, a yellow index difference (ΔYI) before and after the exposure is less than 1, for example, less than or equal to 0.9, for example, less than or equal to 0.8. Herein, the film has a tensile modulus of greater than 6.7 gigapascals (GPa), for example, greater than 7.0 GPa, for example, greater than 7.5 GPa.

Accordingly, the film having a low yellow index and high tensile modulus may be used as a window film and the like for a flexible display device.

Hereafter, this disclosure is described in detail with reference to examples. The following examples and comparative examples are not restrictive, but are illustrative.

EXAMPLES

Synthesis Example 1: Preparation of Poly(Imide-Amide) Copolymer 8,169 grams (g) of N,N-dimethyl acetamide is placed in a reactor, and 276 grams (g) of pyridine is added thereto under a nitrogen atmosphere. Next, 400 g of 2,2'-bis(trifluoromethyl)-4,4'-biphenyldiamine (TFDB) is placed in the reactor and dissolved, to prepare a TFDB solution. Subsequently, 178 g of terephthaloyl chloride (TPCL) is added to the TFDB solution, and the mixture is stirred at 30° C. for 3 hours to obtain an amide oligomer solution. The obtained solution is treated with water to obtain a precipitate, and the precipitate is dried at 80° C. for 48 hours to obtain amide oligomer powder. 59.2 g of the obtained amide oligomer powder, 9.55 g of 4,4'-hexafluoroisopropylidene diphthalic anhydride (6FDA), and 6.33 g of 3,3',4,4'-biphenyltetracarboxylic dianhydride (BPDA) are added to 425 g of N,N-dimethyl acetamide, and the mixture is allowed to react at 30° C. for 48 hours to obtain a poly(amic acid-amide) copolymer solution.

Then, 13.17 g of acetic anhydride as a chemical imidization catalyst is added to the poly(amic acid-amide) copolymer solution, and the mixture is stirred for 30 minutes. 10.39 g of pyridine is added thereto, and the obtained mixture is stirred at 30° C. for 24 hours, to prepare a poly(imide-amide) copolymer solution.

Examples 1 to 3: Preparation of Metallic Salt-Containing Poly(Imide-Amide) Copolymer Film A metallic salt, LiCl, is added to the poly(imide-amide) copolymer solution prepared in Synthesis Example 1 in an amount provided in Table 1 to prepare each poly(imide-amide) copolymer solution including the metallic salt according to Examples 1 to 3. Particularly, LiCl is dissolved in N,N-dimethyl acetamide to prepare a 1 weight percent solution. Then, the LiCl solution is respectively added to the poly(imide-amide) copolymer solution prepared in Synthesis Example 1 in an amount provided in Table 1 based on the total weight of the poly(imide-amide) copolymer and the metallic salt in the solution, and the mixture is stirred for 24 hours to prepare the metallic salt-containing poly(imide-amide) copolymer solution. The amount of Li ion in the solution is indicated in parts per million (ppm) units as described in Table 1.

The prepared copolymer solution is coated on a glass plate to cast a film. The film is dried on a hot plate at 130° C. for 40 minutes, heated up to 280° C. in a furnace at a speed of 10 degrees Centigrade per minute (° C./min), and then, slowly cooled down. Lastly, the poly(imide-amide) copolymer film is separated from the glass plate.

Then, the tensile modulus, yellow index (YI), ΔYI, and transmittance of light in a range of 370 nanometers (nm) to 740 nm of each 50 micrometer-thick (μm-thick) film obtained therefrom are measured, and the results are provided in Table 1. The method of measuring tensile modulus, yellow index (YI), ΔYI, and transmittance of light in a range of 370 nm to 740 nm are as follows:

(1) Film Thickness

The thickness of the film is measured by using Micrometer (Mitutoyo Corp.).

(2) Tensile Modulus

The modulus of the film is measured according to an ASTM D882 method by using an Instron equipment. A 1 centimeter-wide (cm-wide) and 5 centimeter-long (cm-long) film specimen is prepared, and the modulus of the film specimen is measured at room temperature at an elongation speed of 50 millimeters per minute (mm/min).

(3) Transmittance and Yellow Index (YI)

Transmittance and yellow index (YI) are measured using UV spectrophotometer (Konica Minolta Inc., cm-3600d) according to ASTM E313.

(4) Yellow Index (YI) after Radiating UV

A yellow index difference (after radiating UV−before radiating UV) of the film before and after exposing the film to an ultraviolet (UV) lamp of a UVB wavelength region for 72 hours (greater than or equal to 200 millijoules per square centimeter, $mJ/cm^2$) is measured.

Comparative Example 1: Preparation of Poly(Imide-Amide) Copolymer Film without Metallic Salt A film is manufactured in the same method as Examples 1 to 3 by using the poly(imide-amide) copolymer solution according to Synthesis Example 1 except for using no metallic salt.

The tensile modulus, yellow index (YI), ΔYI, and transmittance of light in a range of 370 nm to 740 nm of the film are measured, and the results are provided in Table 1.

Comparative Examples 2 and 3: Preparation of Metallic Salt-Containing Poly(Imide-Amide) Copolymer Film A film is manufactured in the same method as in Examples 1 to 3 by using the metallic salt-containing poly(imide-amide) copolymer solution, except for the difference in the amount of the metallic salt in the solution.

The tensile modulus, yellow index (YI), ΔYI, and transmittance of light in a range of 370 nm to 740 nm of the film are measured, and the results are provided in Table 1.

TABLE 1

| | Amount of Li ion [ppm] | Amount of LiCl [wt %] | Tensile Modulus [GPa] | YI [—] | ΔYI [—] | Transmittance [%] |
|---|---|---|---|---|---|---|
| Comparative Example 3 | 16,000 | 10 | LiCl precipitates in the film | | | |
| Comparative Example 2 | 4,000 | 2.5 | Impossible to cast film | | | |
| Example 3 | 3,000 | 1.9 | 8.4 | 3.3 | 0.8 | 87.7 |
| Example 2 | 2,300 | 1.4 | 7.9 | 2.8 | 0.8 | 88.4 |
| Example 1 | 1,500 | 1 | 7.6 | 2.7 | 0.8 | 88.3 |
| Comparative Example 1 | 0 | 0 | 6.7 | 2.8 | 0.7 | 88.3 |

Referring to the results of Table 1, the films according to Examples 1 to 3, in which less than 2.5 weight percent (wt %) of a metallic salt is added to the solutions of the poly(imide-amide) copolymer, exhibit tensile moduli greater than 7.0 gigapascals (GPa), while maintaining YI of less than 3.5. That is, compared with the film according to Comparative Example 1, in which the metallic salt is not added to the solution of the poly(imide-amide) copolymer, while the copolymer has the same composition as those of Examples 1 to 3, the films according to the Examples 1 to 3 have greatly improved mechanical properties, while maintaining good optical properties. Although mechanical properties improve in proportion to the amount of the metallic salt, when the amount of the metallic salt is 2.5 wt % based on the total solid content of the composition in Comparative Example 2, the composition cannot be casted to fabricate a film due to the increase of viscosity. Meanwhile, when the amount of the metallic salt is 10 wt % in Comparative Example 3, although the composition can be casted to fabricate a film, LiCl precipitates in the film prepared from the composition.

The films according to Examples 1 to 3 exhibit good transmittance of light, that is, greater than or equal to 87%, in a range of from 370 nm to 740 nm, and have low ΔYI, i.e., less than 1, after 72 hours of exposure to UVB. Further, while maintaining less than 3.5 of YI, the films have tensile moduli of greater than 7 GPa. Accordingly, it is favorable to use a solution to obtain a film having increased mechanical properties, while maintaining good optical properties of a film. These films can advantageously be used in an application as a flexible display substrate or a window film that requires high transmittance and surface hardness.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A composition for preparing an article comprising a polyimide or poly(imide-amide) copolymer, the composition comprising:
   (1) a solution comprising at least one of
      (i) a polymer comprising at least one selected from a structural unit represented by Chemical Formula 1, or a structural unit represented by Chemical Formula 2; or
      (ii) a copolymer comprising at least one selected from a structural unit represented by Chemical Formula 1, or a structural unit represented by Chemical Formula 2, and a structural unit represented by Chemical Formula 3, and
   (2) a metallic salt soluble in the solution of the polymer or the copolymer, wherein the metallic salt is a salt of a metal selected from a Group 1 element, a Group 11 element, a Group 13 element, and a Group 14 element, and an amount of the metallic salt is from 0.1 weight percent to less than 2.5 weight percent, based on the total weight of the metallic salt and the at least one of the polymer or copolymer in the composition:

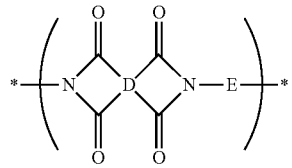

Chemical Formula 1

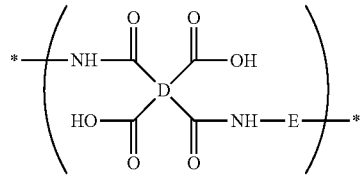

Chemical Formula 2 wherein, in Chemical Formulae 1 and 2,
D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, and the hetero aromatic ring group are present as a single ring, as a condensed ring system comprising two or more fused rings, or as a system comprising two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)(C$_6$H$_5$)—, —C(CF$_3$)$_2$—, or —C(=O)NH—, and
E is a substituted or unsubstituted biphenylene group, wherein the substituted biphenylene group is substituted with an electron-withdrawing group, and Chemical Formula 3

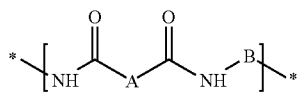

wherein, in Chemical Formula 3,

A is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, and the hetero aromatic ring group are present as a single ring, as a condensed ring system comprising two or more fused rings, or as a system comprising two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, and B is a substituted or unsubstituted biphenylene group, wherein the substituted biphenylene group is substituted with an electron-withdrawing group.

2. The composition of claim 1, wherein the metallic salt is a salt of a metal selected from lithium (Li), sodium (Na), aluminum (Al), silver (Ag), and tin (Sn), and wherein the metallic salt comprises a cation of the metal and an anion selected from a halogen ion, acetylacetonate, ClO$^-$, SO$_4^{2-}$, PO$_4^{3-}$, and NO$_3^-$.

3. The composition of claim 1, wherein the metallic salt is at least one selected from LiCl, NaCl, AgBr, AgNO$_3$, SnCl$_2$, and aluminum acetylacetonate.

4. The composition of claim 1, wherein the amount of the metallic salt is from 0.1 weight percent to 2 weight percent based on the total weight of the metallic salt and the at least one of the polymer and copolymer in the composition.

5. The composition of claim 1, wherein D in Chemical Formula 1 and Chemical Formula 2 are independently selected from chemical formulae of Group 1:

Group 1

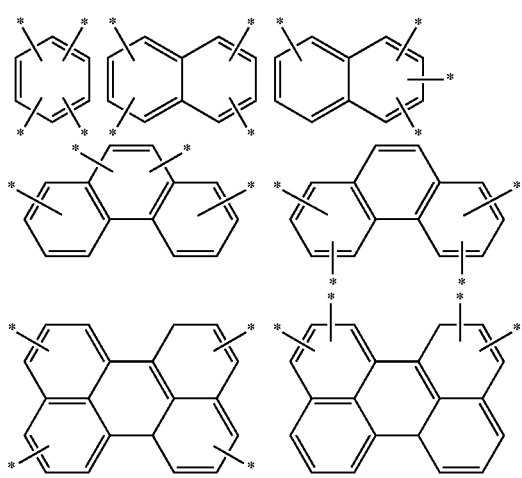

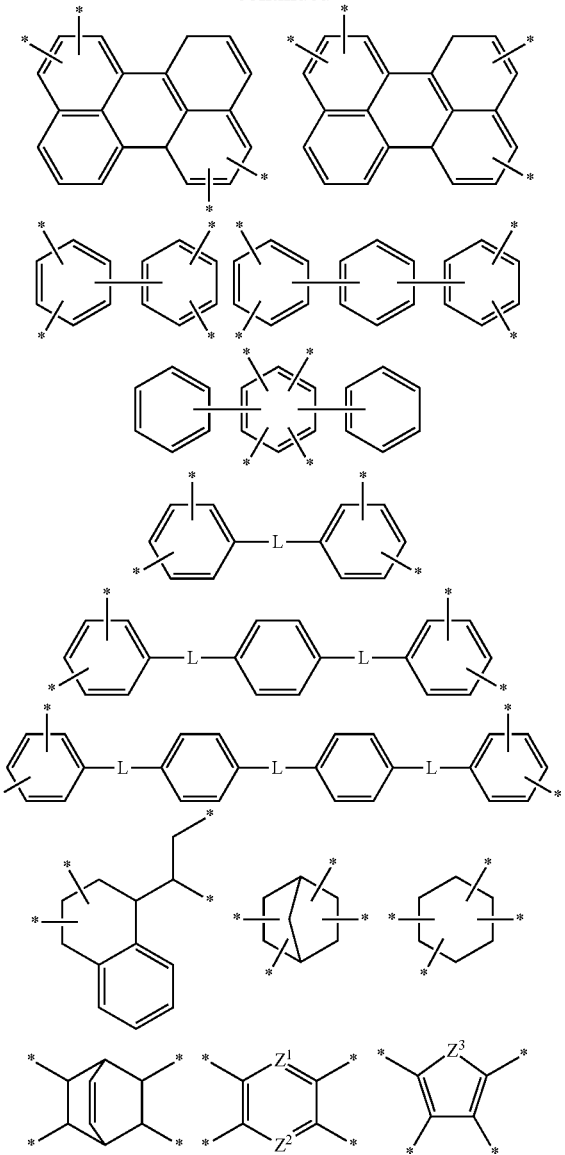

wherein, in the chemical formulae of Group 1, each residual group is substituted or unsubstituted, and each L is the same or different and is independently a single bond, —O—, —S—, —C(=O)—, —CH(OH)—, —S(=O)$_2$—Si(CH$_3$)$_2$—, —(CH$_2$)$_p$— (wherein, 1≤p≤10), (CF$_2$)$_q$ (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, ★ is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

6. The composition of claim 1, wherein D in Chemical Formula 1 and Chemical Formula 2 are independently selected from chemical formulae of Group 2:

Group 2
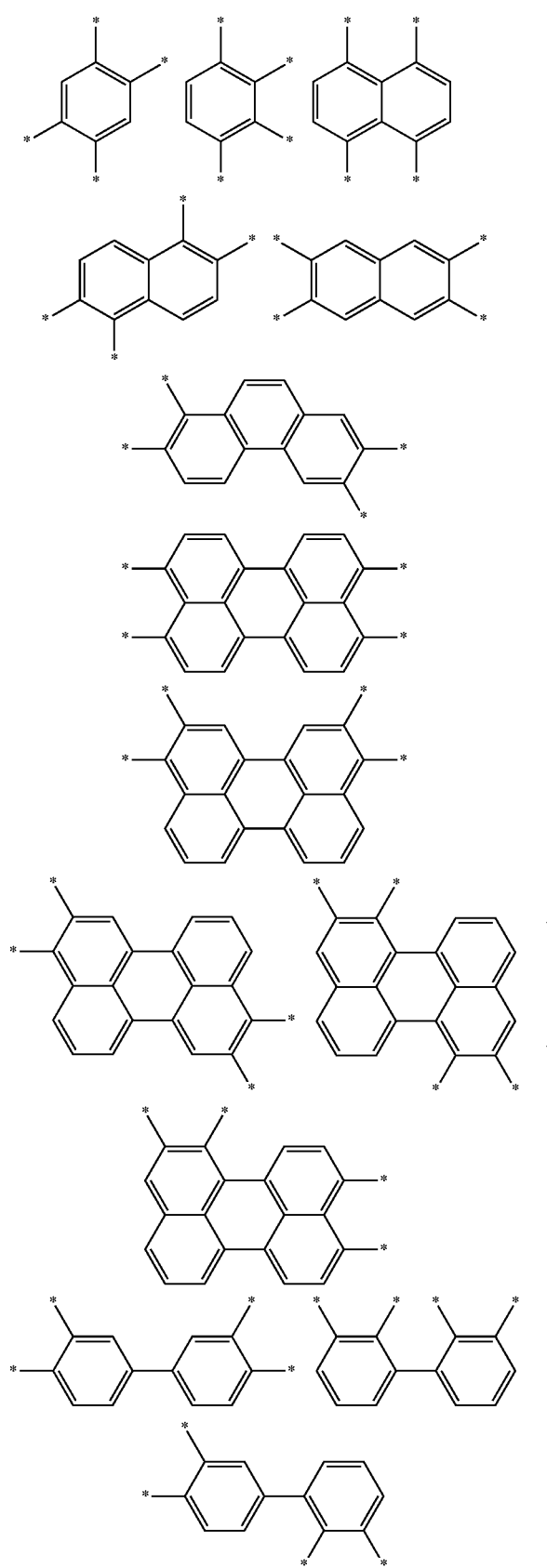
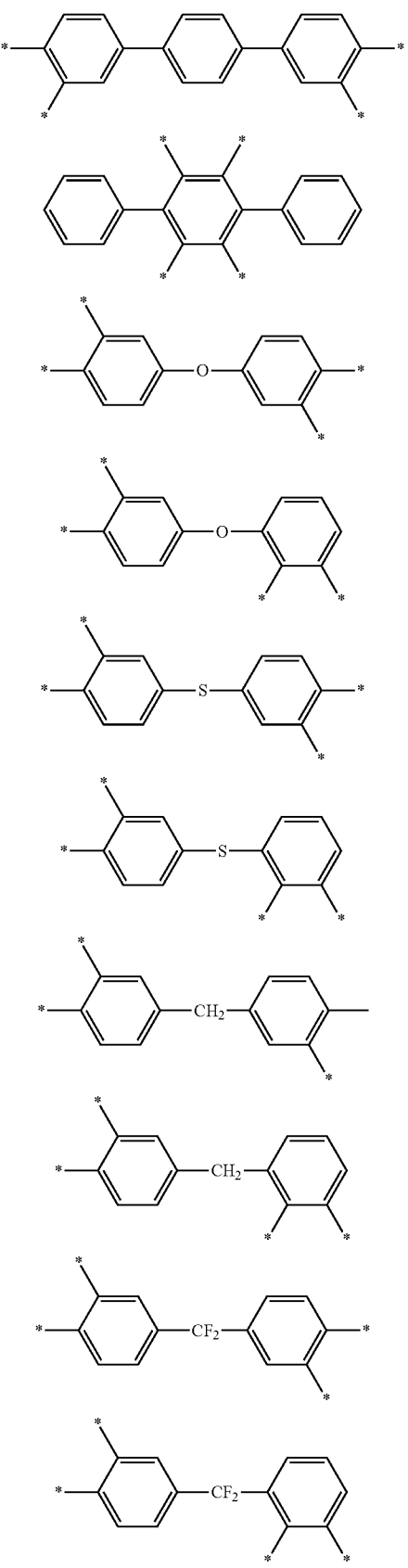
-continued

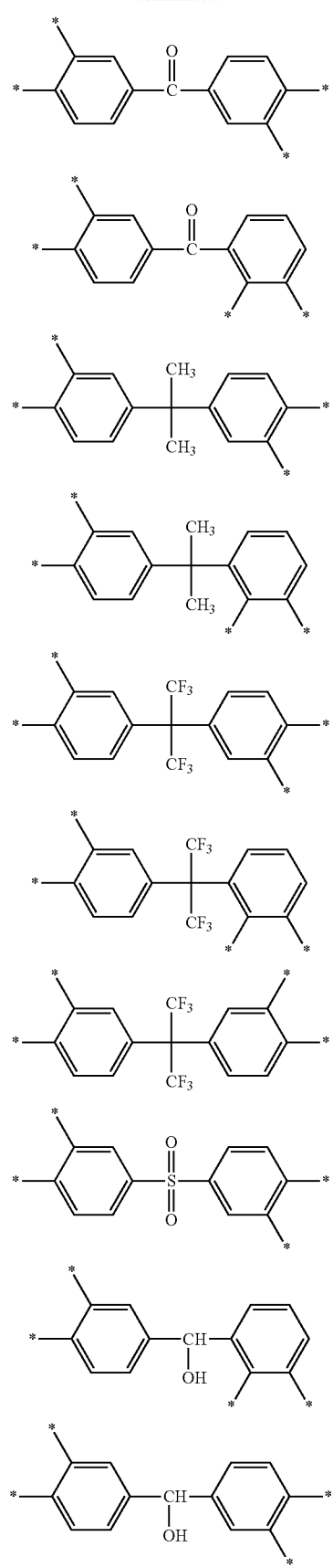
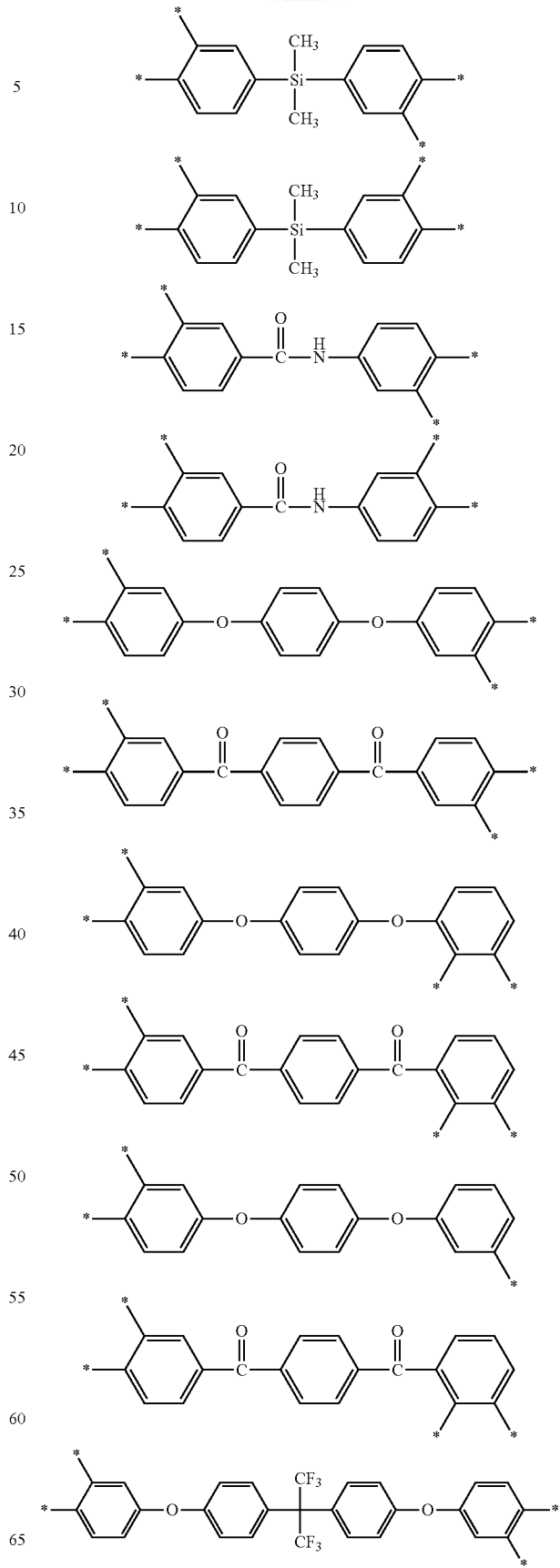

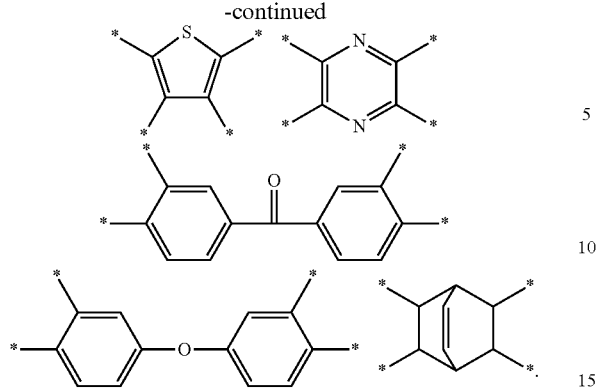

7. The composition of claim 1, wherein D in Chemical Formula 1 and Chemical Formula 2 is independently selected from chemical formulae of Group 3:

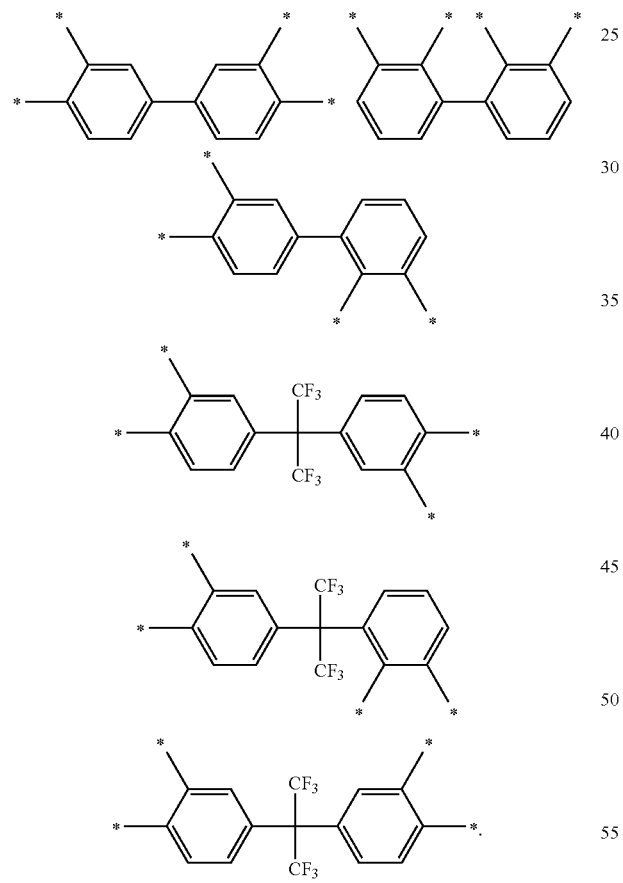

8. The composition of claim 1, wherein E in Chemical Formula 1 and Chemical Formula 2 is a substituted biphenylene group, each ring of which is substituted with an electron-withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$.

9. The composition of claim 1, wherein A in Chemical Formula 3 is selected from chemical formulae of Group 4:

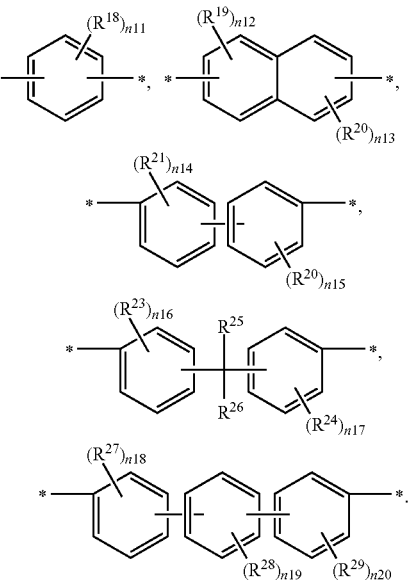

wherein, in the chemical formulae of Group 4,
R$^{18}$ to R$^{29}$ are the same or different and are independently deuterium, a halogen, a substituted or unsubstituted C1 to C10 aliphatic organic group, or a substituted or unsubstituted C6 to C20 aromatic organic group,
n11 and n14 to n20 are independently an integer ranging from 0 to 4, and
n12 and n13 are independently an integer ranging from 0 to 3.

10. The composition of claim 1, wherein A in Chemical Formula 3 is selected from chemical formulae of Group 5:

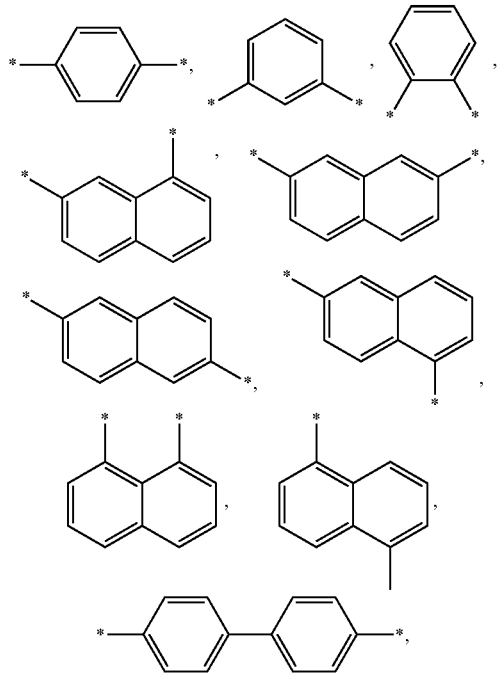

-continued

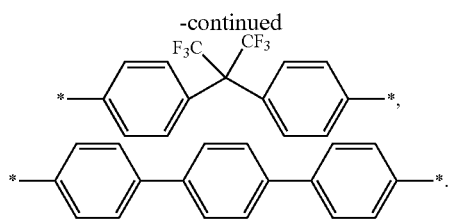

11. The composition of claim 1, wherein B in Chemical Formula 3 is a substituted biphenylene group, each ring of which is substituted with an electron-withdrawing group selected from —$CF_3$, —$CCl_3$, —$CBr_3$, —$I_3$, —F, —Cl, —Br, —I, —$NO_2$, —CN, —$COCH_3$, and —$CO_2C_2H_5$.

12. The composition of claim 1, wherein the structural unit represented by Chemical Formula 1 comprises at least one of a structural unit represented by Chemical Formula 4 and a structural unit represented by Chemical Formula 5:

Chemical Formula 4

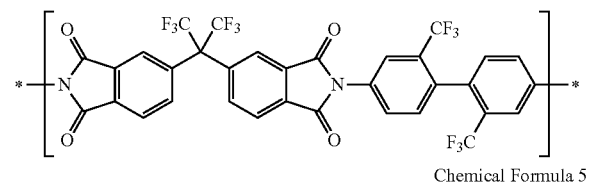

Chemical Formula 5

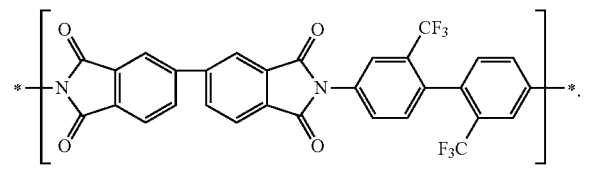

13. The composition of claim 1, wherein the structural unit represented by Chemical Formula 3 comprises at least one of the structural units represented by Chemical Formula 6 to Chemical Formula 8:

Chemical Formula 6

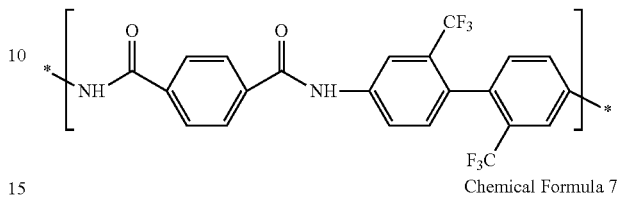

Chemical Formula 7

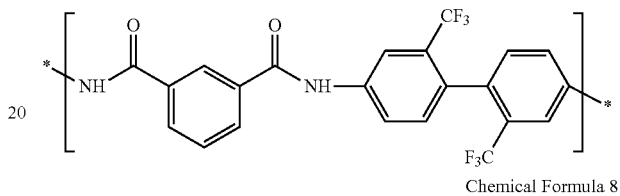

Chemical Formula 8

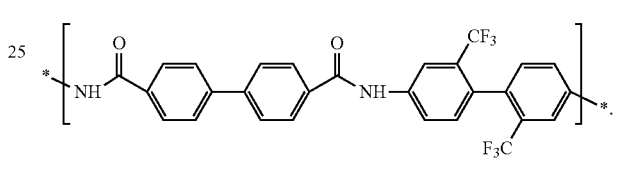

14. The composition of claim 1, wherein the poly(imide-amide) copolymer comprises a structural unit represented by Chemical Formula 4, a structural unit represented by Chemical Formula 5, and a structural unit represented by Chemical Formula 6, and wherein the metallic salt comprises at least one selected from LiCl, NaCl, AgBr, $AgNO_3$, $SnCl_2$, and aluminum acetylacetonate:

Chemical Formula 4

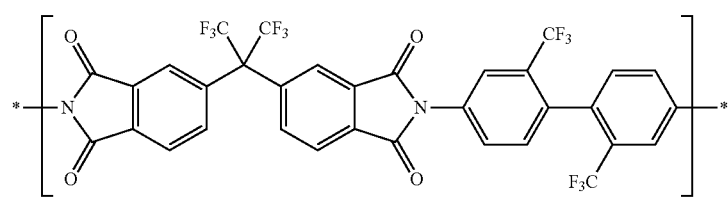

Chemical Formula 5

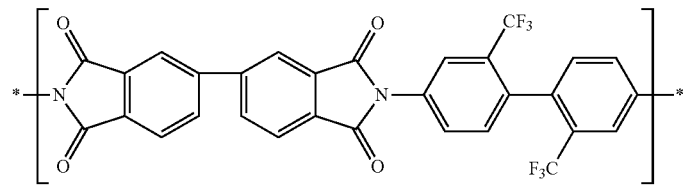

Chemical Formula 6

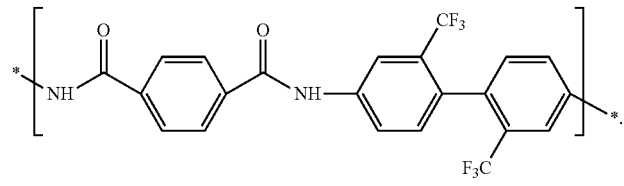

15. The composition of claim 14, wherein a mole ratio of the structural unit represented by Chemical Formula 6 to the sum of the structural unit represented by Chemical Formula 4 and the structural unit represented by Chemical Formula 5 ranges from 80:20 to 50:50.

16. The composition of claim 14, wherein an amount of the metallic salt ranges from 0.1 weight percent to 2 weight percent based on the total weight of the poly(imide-amide) copolymer and the metallic salt.

17. An article comprising a curing product of the composition of claim 1.

18. The article of claim 17, wherein the article is a film having a yellow index of less than 3.5 according to an ASTM E313 method and a tensile modulus of greater than 6.7 gigapascals according to an ASTM D882 method.

19. The article of claim 18, wherein the film has a thickness of about 10 micrometers to about 100 micrometers.

20. A display device comprising the article of claim 17.

* * * * *